US012745317B2

(12) United States Patent
Moon et al.

(10) Patent No.: US 12,745,317 B2
(45) Date of Patent: Sep. 22, 2026

(54) METHOD AND DEVICE FOR TRANSMITTING/RECEIVING CONTROL CHANNEL FOR SENSITIVE TRAFFIC

(71) Applicant: Electronics and Telecommunications Research Institute, Daejeon (KR)

(72) Inventors: Sung Hyun Moon, Daejeon (KR); Cheulsoon Kim, Daejeon (KR); Jung Hoon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 251 days.

(21) Appl. No.: 18/726,774

(22) PCT Filed: Dec. 29, 2022

(86) PCT No.: PCT/KR2022/021668

§ 371 (c)(1),
(2) Date: Jul. 3, 2024

(87) PCT Pub. No.: WO2023/128676

PCT Pub. Date: Jul. 6, 2023

(65) Prior Publication Data

US 2025/0081288 A1 Mar. 6, 2025

(30) Foreign Application Priority Data

Jan. 3, 2022 (KR) ........................ 10-2022-0000584
Feb. 8, 2022 (KR) ........................ 10-2022-0016373
Mar. 4, 2022 (KR) ........................ 10-2022-0028143

(51) Int. Cl.
*H04W 76/28* (2018.01)
*H04W 52/02* (2009.01)
*H04W 72/232* (2023.01)

(52) U.S. Cl.
CPC ....... *H04W 76/28* (2018.02); *H04W 52/0216* (2013.01); *H04W 72/232* (2023.01)

(58) Field of Classification Search
CPC ............... H04W 76/28; H04W 72/232; H04W 52/0216
See application file for complete search history.

(56) References Cited

U.S. PATENT DOCUMENTS 12,047,878 B2 * 7/2024 Kaikkonen ....... H04W 52/0216
2020/0337110 A1 10/2020 Kim (Continued)

FOREIGN PATENT DOCUMENTS

WO 2016/064141 A1 4/2016
WO 2021/020838 A1 2/2021
WO 2021/089857 A1 5/2021

OTHER PUBLICATIONS

International Search Report & Written Opinion for PCT/KR2022/021668 by Korean Intellectual Property Office dated Apr. 5, 2023.

(Continued)

*Primary Examiner* — Shukri Taha
(74) *Attorney, Agent, or Firm* — BROADVIEW IP LAW, PC

(57) ABSTRACT

A method and a device for transmitting/receiving a control channel for sensitive traffic are disclosed. The method of a terminal comprises the steps of: receiving first DRX configuration information from a base station; confirming a first DRX active time and a first DRX inactive time on the basis of the first DRX configuration information; receiving a first downlink signal set from the base station in the first DRX active time; and receiving a second downlink signal set from the base station in the first DRX inactive time.

20 Claims, 14 Drawing Sheets

(56) References Cited

U.S. PATENT DOCUMENTS

| | | | | |
|---|---|---|---|---|
| 2021/0007050 | A1 | 1/2021 | Lin | |
| 2021/0112420 | A1 | 4/2021 | Vajapeyam et al. | |
| 2021/0328726 | A1 | 10/2021 | Wei et al. | |
| 2022/0006583 | A1 | 1/2022 | Manolakos et al. | |
| 2022/0007292 | A1 | 1/2022 | Seo et al. | |
| 2022/0007456 | A1 | 1/2022 | Bao et al. | |
| 2022/0022279 | A1 | 1/2022 | Kim et al. | |
| 2022/0353945 | A1* | 11/2022 | Liu | H04W 76/28 |
| 2023/0300940 | A1* | 9/2023 | Jang | H04W 24/10 370/329 |
| 2023/0413174 | A1* | 12/2023 | Cheng | H04W 52/0216 |
| 2024/0414651 | A1* | 12/2024 | Kang | H04W 52/0235 |

OTHER PUBLICATIONS

3GPP TSG RAN WG1 "Discussions and initial self evaluation on energy efficiency," R1-1806333. May 2018.

3GPP TSG RAN WG1 "UE Power saving schemes and power saving signal/channel," R1-1902025. Feb. 2019.

3GPP TSG RAN WG1 "UE Power saving scheme for RRM measurements" R1-1902026. Feb. 2019.

3GPP TS 38.300 V16.8.0, "NR; NR and NG-RAN Overall Description; Stage 2," Release 16. Dec. 2021.

3GPP TS 38.321 V16.7.0, "NR; Medium Access Control (MAC) protocol specification," Release 16. Dec. 2021.

3GPP TS 38.331 V16.7.0, "NR; Radio Resource Control (RRC) protocol specification," Release 16. Dec. 2021.

ZTE, "Consideration on UE power consumption model and preliminary evaluation results," 3GPP TSG RAN WG1 Meeting #95, Nov. 2018. doc: R1-1812420.

MediaTek Inc., "Discussion on RLM Requirements," 3GPP TSG RAN WG4 Meeting #85, Dec. 2017. doc: R4-1712399.

Apple, "On reference cell availability for NR-U," 3GPP TSG-RAN4 Meeting #98bis-e, Apr. 2021. doc: R4-2104823.

* cited by examiner

METHOD AND DEVICE FOR TRANSMITTING/RECEIVING CONTROL CHANNEL FOR SENSITIVE TRAFFIC

CROSS-REFERENCE TO RELATED APPLICATIONS

This application is a National Phase Entry Application of PCT Application No. PCT/KR2022/021668, filed on Dec. 29, 2022, which claims priority to Korean Patent Application No. 10-2022-0000584, filed on Jan. 3, 2022, Korean Patent Application No. 10-2022-0016373, filed on Feb. 8, 2022, and Korean Patent Application No. 10-2022-0028143, filed on Mar. 4, 2022, in the Korean Intellectual Property Office, the entire contents of which are hereby incorporated by reference in its entirety.

TECHNICAL FIELD

The present disclosure relates to a technique for transmitting and receiving a control channel in a communication system, and more particularly, to a technique for transmitting and receiving a control channel sensitive to a jitter.

BACKGROUND ART

A mobile communication system may be a core infrastructure driving the overall development of the Internet and communication technology (ICT) industry, and is evolving step by step overcoming the disadvantages and limitations of the existing communication networks. A next-generation wireless communication system can provide various advanced services in usage scenarios such as enhanced mobile broadband (eMBB), ultra-reliable low-latency communication (URLC), and massive machine type communication (mMTC). In order to provide a variety of advanced services, a used frequency band tends to gradually expand. For example, the conventional wireless communication system (e.g., long term evolution (LTE) communication system) may utilize a frequency band of 6 to 7 GHz or less, and the next-generation wireless communication system (e.g., new radio (NR) communication system or 6G communication system) may utilize up to a frequency band of tens to hundreds of GHz. Accordingly, although a processing capacity of a communication node is greatly increased, there may be a problem that power consumption in the communication node also increases. In particular, since a power for a terminal is supplied by a battery, satisfaction in service experiences may be reduced due to a fast power consumption of the terminal, and application fields of the terminal may be limited. Therefore, improved signal transmission methods for supporting low-power operations of the terminal may be required.

DISCLOSURE

Technical Problem

The present disclosure is directed to providing a method and an apparatus for transmitting and receiving a control channel for transmission of traffic sensitive to a jitter in a communication system.

Technical Solution

A method of a terminal, according to a first exemplary embodiment of the present disclosure for achieving the above-described objective, may comprise: receiving first discontinuous reception (DRX) configuration information from a base station; identifying a first DRX active time and a first DRX inactive time based on the first DRX configuration information; receiving a first downlink signal set from the base station in the first DRX active time; and receiving a second downlink signal set from the base station in the first DRX inactive time, wherein the first DRX active time is distinguished from the first DRX inactive time in time domain, an intersection between the first downlink signal set and the second downlink signal set includes at least a synchronization signal block (SSB), and a difference between the first downlink signal set and the second downlink signal set includes at least a physical downlink shared channel (PDSCH) including unicast downlink data.

The first DRX configuration information may be included in a downlink control information (DCI) format commonly transmitted to a terminal group.

The first DRX configuration information may be received by the terminal together with discontinuous transmission (DTX) configuration information.

At least a physical uplink shared channel (PUSCH) including unicast uplink data may not be transmitted from the terminal in a DTX inactive time configured based on the DTX configuration information.

The method may further comprise: receiving second DRX configuration information from the base station; identifying a second DRX active time and a second DRX inactive time based on the second DRX configuration information; and performing a monitoring operation on one or more search space sets in the second DRX active time.

The first DRX active time may be divided into a first time period belonging to the second DRX active time and a second time period belonging to the second DRX inactive time, and different physical downlink control channel (PDCCH) monitoring operations may be performed in the first time period and the second period.

The first DRX active time may be divided into a first time period belonging to the second DRX active time and a second time period belonging to the second DRX inactive time, and a PDCCH monitoring operation may be skipped in the second time period.

The second DRX active time may be divided into a third time period belonging to the first DRX active time and a fourth time period belonging to the first DRX inactive time, and monitoring operations on different search space sets may be performed in the third time period and the fourth time period.

In the third time period and the fourth time period, a common search space (CSS) set may be commonly monitored.

The second DRX configuration information may be included in a terminal-specific radio resource control (RRC) message transmitted to the terminal.

A method of a base station, according to a second exemplary embodiment of the present disclosure for achieving the above-described objective, may comprise: transmitting first discontinuous reception (DRX) configuration information to a terminal; transmitting a first downlink signal set to the terminal in a first DRX active time according to the first DRX configuration information; and transmitting a second downlink signal set to the terminal in a first DRX inactive time according to the first DRX configuration information, wherein the first DRX active time is distinguished from the first DRX inactive time in time domain, an intersection between the first downlink signal set and the second downlink signal set includes at least a synchronization signal block (SSB), and a difference between the first downlink signal set and the second downlink signal set includes at least a physical downlink shared channel (PDSCH) including unicast downlink data.

The first DRX configuration information may be included in a downlink control information (DCI) format commonly transmitted to a terminal group.

The first DRX configuration information may be transmitted to the terminal together with discontinuous transmission (DTX) configuration information.

At least a physical uplink shared channel (PUSCH) including unicast uplink data may not be received from the terminal in a DTX inactive time configured based on the DTX configuration information.

A terminal, according to a third exemplary embodiment of the present disclosure for achieving the above-described objective, may comprise a processor, and the processor may cause the terminal to perform: receiving first discontinuous reception (DRX) configuration information from a base station; identifying a first DRX active time and a first DRX inactive time based on the first DRX configuration information; receiving a first downlink signal set from the base station in the first DRX active time; and receiving a second downlink signal set from the base station in the first DRX inactive time, wherein the first DRX active time is distinguished from the first DRX inactive time in time domain, an intersection between the first downlink signal set and the second downlink signal set includes at least a synchronization signal block (SSB), and a difference between the first downlink signal set and the second downlink signal set includes at least a physical downlink shared channel (PDSCH) including unicast downlink data.

The first DRX configuration information may be received by the terminal together with discontinuous transmission (DTX) configuration information, and at least a physical uplink shared channel (PUSCH) including unicast uplink data may not be transmitted from the terminal in a DTX inactive time configured based on the DTX configuration information.

The processor may further cause the terminal to perform: receiving second DRX configuration information from the base station; identifying a second DRX active time and a second DRX inactive time based on the second DRX configuration information; and performing a monitoring operation on one or more search space sets in the second DRX active time.

The first DRX active time may be divided into a first time period belonging to the second DRX active time and a second time period belonging to the second DRX inactive time, and different physical downlink control channel (PDCCH) monitoring operations may be performed in the first time period and the second period.

The first DRX active time may be divided into a first time period belonging to the second DRX active time and a second time period belonging to the second DRX inactive time, and a PDCCH monitoring operation may be skipped in the second time period.

The second DRX active time may be divided into a third time period belonging to the first DRX active time and a fourth time period belonging to the first DRX inactive time, and monitoring operations on different search space sets may be performed in the third time period and the fourth time period.

Advantageous Effects

According to the present disclosure, discontinuous reception (DRX) configuration and/or discontinuous transmission (DTX) configuration may be provided to a terminal. The terminal may perform a signal reception operation according to the DRX configuration, and may perform a signal transmission operation according to the DTX configuration. A base station may transmit a signal in consideration of the DRX configuration configured in the terminal, and may perform a signal reception operation in consideration of the DTX configuration configured in the terminal. Accordingly, the signal transmission and reception operations can be performed efficiently, and the performance of the communication system can be improved.

MODE FOR INVENTION

Figure 1:
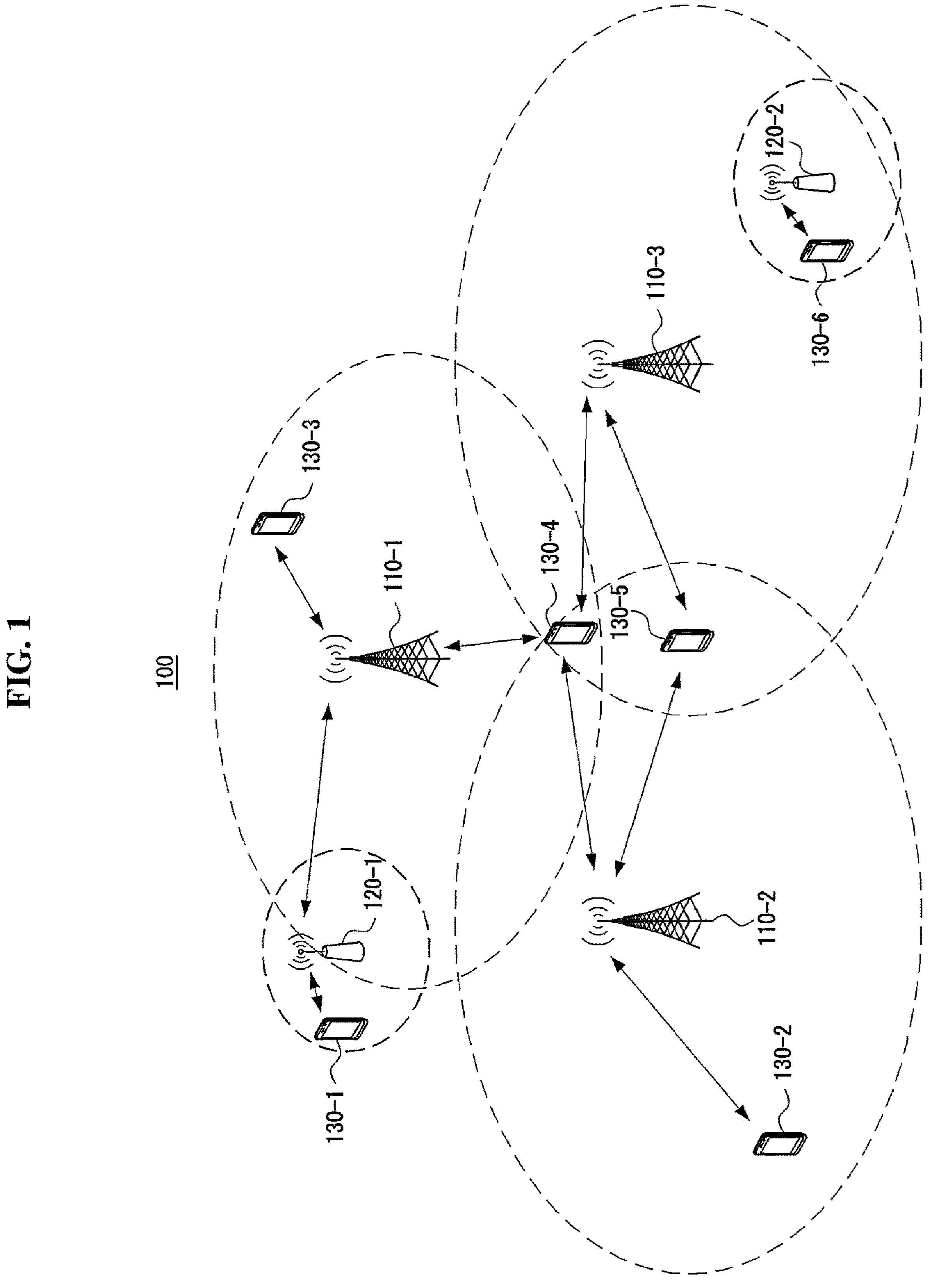
FIG. 1 is a conceptual diagram illustrating a first exemplary embodiment of a communication system.

Exemplary embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system may be the 4G communication system (e.g., Long-Term Evolution (LTE) communication system or LTE-A communication system), the 5G communication system (e.g., New Radio (NR) communication system), the sixth generation (6G) communication system, or the like. The 4G communication system may support communications in a frequency band of 6 GHz or below, and the 5G communication system may support communications in a frequency band of 6 GHz or above as well as the frequency band of 6 GHz or below. The communication system to which the exemplary embodiments according to the present disclosure are applied is not limited to the contents described below, and the exemplary embodiments according to the present disclosure may be applied to various communication systems. Here, the communication system may be used in the same sense as a communication network, 'LTE' may refer to '4G communication system', 'LTE communication system', or 'LTE-A communication system', and 'NR' may refer to '5G communication system' or 'NR communication system'.

In exemplary embodiments, 'configuration of an operation (e.g., transmission operation)' may mean 'signaling of configuration information (e.g., information element(s), parameter(s)) for the operation' and/or 'signaling of information indicating performing of the operation'. 'Configuration of information element(s) (e.g., parameter(s))' may mean that the corresponding information element(s) are signaled. 'Configuration of a resource (e.g., resource region)' may mean that configuration information of the corresponding resource is signaled. The signaling may be performed based on at least one of system information (SI) signaling (e.g., transmission of system information block (SIB) and/or master information block (MIB)), RRC signaling (e.g., transmission of RRC parameters and/or higher layer parameters), MAC control element (CE) signaling, PHY signaling (e.g., transmission of downlink control information (DCI), uplink control information (UCI), and/or sidelink control information (SCI)), or a combination thereof.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may further comprise a core network (e.g., a serving gateway (S-GW), a packet data network (PDN) gateway (P-GW), and a mobility management entity (MME)). When the communication system 100 is a 5G communication system (e.g., New Radio (NR) system), the core network may include an access and mobility management function (AMF), a user plane function (UPF), a session management function (SMF), and the like.

The plurality of communication nodes 110 to 130 may support communication protocols defined in the 3rd generation partnership project (3GPP) technical specifications (e.g., LTE communication protocol, LTE-A communication protocol, NR communication protocol, or the like). The plurality of communication nodes 110 to 130 may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may mean an apparatus or a device. Exemplary embodiments may be performed by an apparatus or device. A structure of the apparatus (or, device) may be as follows.

Figure 2:
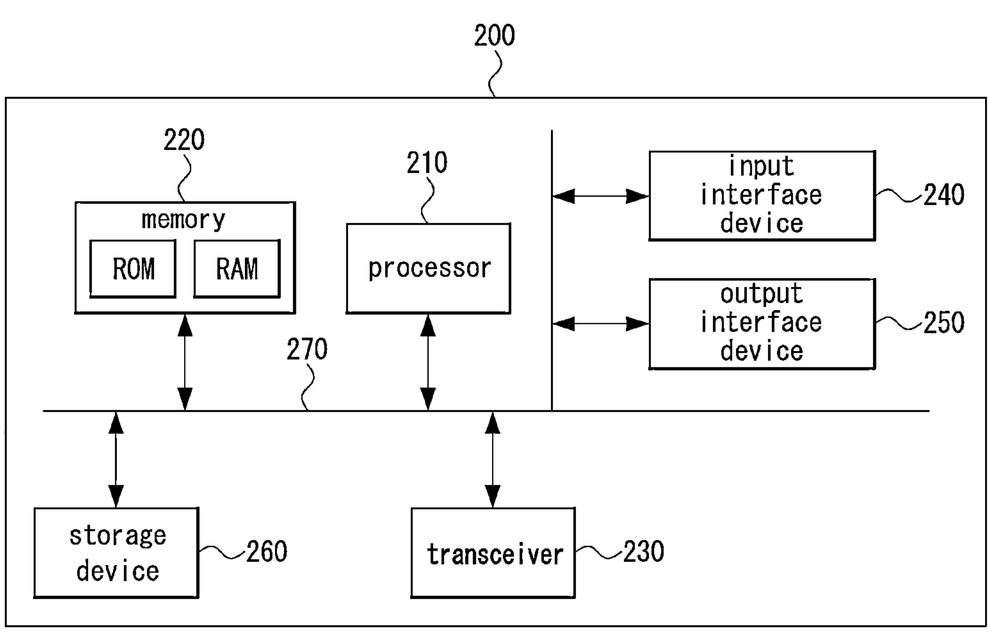
FIG. 2 is a block diagram illustrating a first exemplary embodiment of an apparatus constituting a communication system.

FIG. 2 is a block diagram illustrating a first exemplary embodiment of an apparatus constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), or the like.

Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

Each of the first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

The present disclosure may relate to techniques for transmitting and receiving signals in a communication system. Methods of transmitting a downlink control channel for reducing power consumption of a terminal in a wireless communication system will be described. The exemplary embodiments of the present disclosure may be applied not only to the NR communication system but also to other communication systems (e.g., LTE communication system, 5G communication system, 6G communication system, or the like).

The NR communication system may support a system bandwidth (e.g., carrier bandwidth) wider than a system bandwidth provided by the LTE communication system in order to efficiently use a wide frequency band. For example, the maximum system bandwidth supported by the LTE communication system may be 20 MHz. On the other hand, the NR communication system may support a carrier bandwidth of up to 100 MHz in a frequency band of 6 GHz or below, and may support a carrier bandwidth of up to 400 MHz in a frequency band of 6 GHz or above.

A numerology applied to physical signals and channels in the communication system (e.g., NR communication system or 6G communication system) may be variable. The numerology may vary to satisfy various technical requirements of the communication system. In the communication system to which a cyclic prefix (CP) based OFDM waveform technology is applied, the numerology may include a subcarrier spacing and a CP length (or CP type). Table 1 below may be a first exemplary embodiment of configuration of numerologies for the CP-based OFDM. The subcarrier spacings may have an exponential multiplication relationship of 2, and the CP length may be scaled at the same ratio as the OFDM symbol length. Depending on a frequency band in which the communication system operates, at least some numerologies among the numerologies of Table 1 may be supported. In addition, in the communication system, numerologies not listed in Table 1 may be further supported. CP type(s) not listed in Table 1 (e.g., extended CP) may be additionally supported for a specific subcarrier spacing (e.g., 60 kHz).

TABLE 1

| | Subcarrier spacing | | | | | |
|---|---|---|---|---|---|---|
| | 15 kHz | 30 kHz | 60 kHz | 120 kHz | 240 kHz | 480 kHz |
| OFDM symbol length [μs] | 66.7 | 33.3 | 16.7 | 8.3 | 4.2 | 2.1 |
| CP length [μs] | 4.76 | 2.38 | 1.19 | 0.60 | 0.30 | 0.15 |
| Number of OFDM symbols within 1 ms | 14 | 28 | 56 | 112 | 224 | 448 |

In the following description, a frame structure in the communication system will be described. In the time domain, elements constituting a frame structure may include a subframe, slot, mini-slot, symbol, and the like. The subframe may be used as a unit for transmission, measurement, and the like, and the length of the subframe may have a fixed value (e.g., 1 ms) regardless of a subcarrier spacing. A slot may comprise consecutive symbols (e.g., 14 OFDM symbols). The length of the slot may be variable differently from the length of the subframe. For example, the length of the slot may be inversely proportional to the subcarrier spacing.

A slot may be used as a unit for transmission, measurement, scheduling, resource configuration, timing (e.g., scheduling timing, hybrid automatic repeat request (HARQ) timing, channel state information (CSI) measurement and reporting timing, etc.), and the like. The length of an actual time resource used for transmission, measurement, scheduling, resource configuration, etc. may not match the length of a slot. A mini-slot may include consecutive symbol(s), and the length of a mini-slot may be shorter than the length of a slot. A mini-slot may be used as a unit for transmission, measurement, scheduling, resource configuration, timing, and the like. A mini-slot (e.g., the length of a mini-slot, a mini-slot boundary, etc.) may be predefined in the technical specification. Alternatively, a mini-slot (e.g., the length of a mini-slot, a mini-slot boundary, etc.) may be configured (or indicated) to the terminal. When a specific condition is satisfied, use of a mini-slot may be configured (or indicated) to the terminal.

The base station may schedule a data channel (e.g., physical downlink shared channel (PDSCH), physical uplink shared channel (PUSCH), physical sidelink shared channel (PSSCH)) using some or all of symbols constituting a slot. In particular, for URLLC transmission, unlicensed band transmission, transmission in a situation where an NR communication system and an LTE communication system coexist, and multi-user scheduling based on analog beamforming, a data channel may be transmitted using a portion of a slot. In addition, the base station may schedule a data channel using a plurality of slots. In addition, the base station may schedule a data channel using at least one mini-slot.

In the frequency domain, elements constituting the frame structure may include a resource block (RB), subcarrier, and the like. One RB may include consecutive subcarriers (e.g., 12 subcarriers). The number of subcarriers constituting one RB may be constant regardless of a numerology. In this case, a bandwidth occupied by one RB may be proportional to a subcarrier spacing of a numerology. An RB may be used as a transmission and resource allocation unit for a data channel, control channel, and the like. Resource allocation of a data channel may be performed in units of RBs or RB groups (e.g., resource block group (RBG)). One RBG may include one or more consecutive RBs. Resource allocation of a control channel may be performed in units of control channel elements (CCEs). One CCE in the frequency domain may include one or more RBs.

In the NR communication system, a slot (e.g., slot format) may be composed of a combination of one or more of downlink period, flexible period (or unknown period), and an uplink period. Each of a downlink period, flexible period, and uplink period may be comprised of one or more consecutive symbols. A flexible period may be located between a downlink period and an uplink period, between a first downlink period and a second downlink period, or between a first uplink period and a second uplink period. When a flexible period is inserted between a downlink period and an uplink period, the flexible period may be used as a guard period.

A slot may include one or more flexible periods. Alternatively, a slot may not include a flexible period. The terminal may perform a predefined operation in a flexible period. Alternatively, the terminal may perform an operation configured by the base station semi-statically or periodically. For example, the periodic operation configured by the base station may include a PDCCH monitoring operation, synchronization signal/physical broadcast channel (SS/PBCH) block reception and measurement operation, channel state information-reference signal (CSI-RS) reception and measurement operation, downlink semi-persistent scheduling (SPS) PDSCH reception operation, sounding reference signal (SRS) transmission operation, physical random access channel (PRACH) transmission operation, periodically-configured PUCCH transmission operation, PUSCH transmission operation according to a configured grant, and the like. A flexible symbol may be overridden by a downlink symbol or an uplink symbol. When a flexible symbol is overridden by a downlink or uplink symbol, the terminal may perform a new operation instead of the existing operation in the corresponding flexible symbol (e.g., overridden flexible symbol).

In the present disclosure, a synchronization signal block (SSB) may mean a signal set comprising synchronization signal(s) and/or broadcast channel(s). The synchronization signal(s) may include a primary synchronization signal (PSS), secondary synchronization signal (SSS), and/or the like, and the broadcast channel(s) may include a physical broadcast channel (PBCH). In addition, the SSB may further include reference signal(s) (e.g., DM-RS for decoding (or demodulation) of the PBCH, CSI-RS, tracking reference signal (TRS), positioning reference signal (PRS), phase tracking reference signal (PT-RS), and/or the like). In the NR communication system, the SSB may refer to a synchronization signal/physical broadcast channel (SS/PBCH) block. The SSB may be transmitted periodically, and one or more SSB(s) may be repeatedly transmitted in one period.

A slot format may be configured semi-statically by higher layer signaling (e.g., radio resource control (RRC) signaling). Information indicating a semi-static slot format may be included in system information, and the semi-static slot format may be configured in a cell-specific manner. In addition, a semi-static slot format may be additionally configured for each terminal through terminal-specific higher layer signaling (e.g., RRC signaling). A flexible symbol of a slot format configured cell-specifically may be overridden by a downlink symbol or an uplink symbol by terminal-specific higher layer signaling. In addition, a slot format may be dynamically indicated by physical layer signaling (e.g., slot format indicator (SFI) included in downlink control information (DCI)). The semi-statically configured slot format may be overridden by a dynamically indicated slot format. For example, a semi-static flexible symbol may be overridden by a downlink symbol or an uplink symbol by SFI.

The terminal may perform downlink operations, uplink operations, and sidelink operations in a bandwidth part. A bandwidth part may be defined as a set of consecutive RBs (e.g., physical resource blocks (PRBs)) having a specific numerology in the frequency domain. One numerology may be used for transmission of signals (e.g., transmission of control channel or data channel) in one bandwidth part. In exemplary embodiments, when used in a broad sense, a 'signal' may refer to any physical signal and channel. A terminal performing an initial access procedure may obtain configuration information of an initial bandwidth part from the base station through system information. A terminal operating in an RRC connected state may obtain the configuration information of the bandwidth part from the base station through terminal-specific higher layer signaling.

The configuration information of the bandwidth part may include a numerology (e.g., a subcarrier spacing and a CP length) applied to the bandwidth part. Also, the configuration information of the bandwidth part may further include information indicating a position of a start RB (e.g., start PRB) of the bandwidth part and information indicating the number of RBs (e.g., PRBs) constituting the bandwidth part. At least one bandwidth part among the bandwidth part(s) configured in the terminal may be activated. For example, within one carrier, one uplink bandwidth part and one downlink bandwidth part may be activated respectively. In a time division duplex (TDD) based communication system, a pair of an uplink bandwidth part and a downlink bandwidth part may be activated. The base station may configure a plurality of bandwidth parts to the terminal within one carrier, and may switch the active bandwidth part of the terminal.

In exemplary embodiments, the expression 'a certain frequency band (e.g., carrier, bandwidth portion, RB set, listen before talk (LBT) subband, guard band, or the like) is activated' may mean that the base station or terminal is in a state of capable of transmitting and receiving a signal by using the frequency band. In addition, the expression 'a certain frequency band is activated' may mean that a radio frequency (RF) filter (e.g., band pass filter) of a transceiver is in a state of operating in a frequency band including the certain frequency band.

In exemplary embodiments, an RB may mean a common RB (CRB). Alternatively, an RB may mean a PRB or a virtual RB (VRB). In the NR communication system, a CRB may refer to an RB constituting a set of consecutive RBs (e.g., common RB grid) based on a reference frequency (e.g., point A). Carriers, bandwidth part, and the like may be arranged on the common RB grid. In other words, a carrier, bandwidth part, etc. may be composed of CRB(s). An RB or CRB constituting a bandwidth part may be referred to as a PRB, and a CRB index within the bandwidth part may be appropriately converted into a PRB index. In an exemplary embodiment, an RB may refer to an interlace RB (IRB).

A PDCCH may be used to transmit DCI or a DCI format to the terminal. A minimum resource unit constituting a PDCCH may be a resource element group (REG). An REG may be composed of one PRB (e.g., 12 subcarriers) in the frequency domain and one OFDM symbol in the time domain. Thus, one REG may include 12 resource elements (REs). A demodulation reference signal (DMRS) for demodulating a PDCCH may be mapped to 3 REs among 12 REs constituting the REG, and control information (e.g., modulated DCI) may be mapped to the remaining 9 REs.

One PDCCH candidate may be composed of one CCE or aggregated CCEs. One CCE may be composed of a plurality of REGs. The NR communication system may support CCE aggregation levels 1, 2, 4, 8, 16, and the like, and one CCE may consist of six REGs.

A control resource set (CORESET) may be a resource region in which the terminal performs a blind decoding on PDCCHs. The CORESET may be composed of a plurality of REGs. The CORESET may consist of one or more PRBs in the frequency domain and one or more symbols (e.g., OFDM symbols) in the time domain. The symbols constituting one CORESET may be consecutive in the time domain. The PRBs constituting one CORESET may be consecutive or non-consecutive in the frequency domain. One DCI (e.g., one DCI format or one PDCCH) may be transmitted within one CORESET. A plurality of CORESETs may be configured with respect to a cell and a terminal, and the plurality of CORESETs may overlap in time-frequency resources.

A CORESET may be configured in the terminal by a PBCH (e.g., system information or a master information block (MIB) transmitted on the PBCH). The identifier (ID) of the CORESET configured by the PBCH may be 0. That is, the CORESET configured by the PBCH may be referred to as a CORESET #0. A terminal operating in an RRC idle state may perform a monitoring operation in the CORESET #0 in order to receive a first PDCCH in the initial access procedure. Not only terminals operating in the RRC idle state but also terminals operating in the RRC connected state may perform monitoring operations in the CORESET #0. The CORESET may be configured in the terminal by other system information (e.g., system information block type 1 (SIB1)) other than the system information transmitted through the PBCH. For example, for reception of a random access response (or Msg2) in a random access procedure, the terminal may receive the SIB1 including the configuration information of the CORESET. Also, the CORESET may be configured in the terminal by terminal-specific higher layer signaling (e.g., RRC signaling).

In each downlink bandwidth part, one or more CORESETs may be configured for the terminal. Here, the expression 'a CORESET is configured in a bandwidth part' may mean that the CORESET is logically associated with the bandwidth part, and the terminal monitors the CORESET in the bandwidth part. The initial downlink active bandwidth part may include the CORESET #0 and may be associated with the CORESET #0. The CORESET #0 having a quasi-co-location (QCL) relationship with a synchronization signal block (SSB) may be configured for the terminal in a primary cell (PCell), a secondary cell (SCell), and a primary secondary cell (PSCell). In the secondary cell (SCell), the CORESET #0 may not be configured for the terminal.

A search space may be a set of candidate resource regions through which PDCCHs can be transmitted. The terminal may perform a blind decoding on each of the PDCCH candidates within a predefined search space. The terminal may determine whether a PDCCH is transmitted to itself by performing a cyclic redundancy check (CRC) on a result of the blind decoding. When it is determined that a PDCCH is a PDCCH for the terminal itself, the terminal may receive the PDCCH.

A PDCCH candidate may be configured with CCEs selected by a predefined hash function within an occasion of the CORESET or the search space. The search space may be defined and configured for each CCE aggregation level. In this case, a set of search spaces for all CCE aggregation levels may be referred to as a 'search space set'. In exemplary embodiments, 'search space' may mean 'search space set', and 'search space set' may mean 'search space'.

A search space set may be logically associated with one CORESET. One CORESET may be logically associated with one or more search space sets. A common search space set configured through the PBCH may be used to monitor DCI scheduling a PDSCH for transmitting an SIB1. An ID of the common search space set configured through the PBCH may be set to 0. That is, the common search space set configured through the PBCH may be defined as a Type 0 PDCCH common search space set or a search space set #0. The search space set #0 may be logically associated with the CORESET #0.

The search space set may be classified into a common search space set and a terminal (UE)-specific search space set according to the purpose of the search space set and/or operations related to the search space set. Common DCI may be transmitted in the common search space set, and terminal (UE)-specific DCI may be transmitted in the UE-specific search space set. Considering scheduling freedom and/or fallback transmission, UE-specific DCI may be transmitted even in the common search space set. For example, common DCI may include at least one of resource allocation information of a PDSCH for transmission of system information, paging, power control command, slot format indicator (SFI), or preemption indicator. UE-specific DCI may include resource allocation information of a PDSCH, resource allocation information of a PUSCH, and/or the like. A plurality of DCI formats may be defined according to a payload, size, type of a radio network temporary identifier (RNTI), and/or the like of the DCI In the present disclosure, a common search space may be referred to as 'CSS', and a common search space set may be referred to as 'CSS set'. A UE-specific search space may be referred to as 'USS', and a UE-specific search space set may be referred to as 'USS set'.

Figure 3:
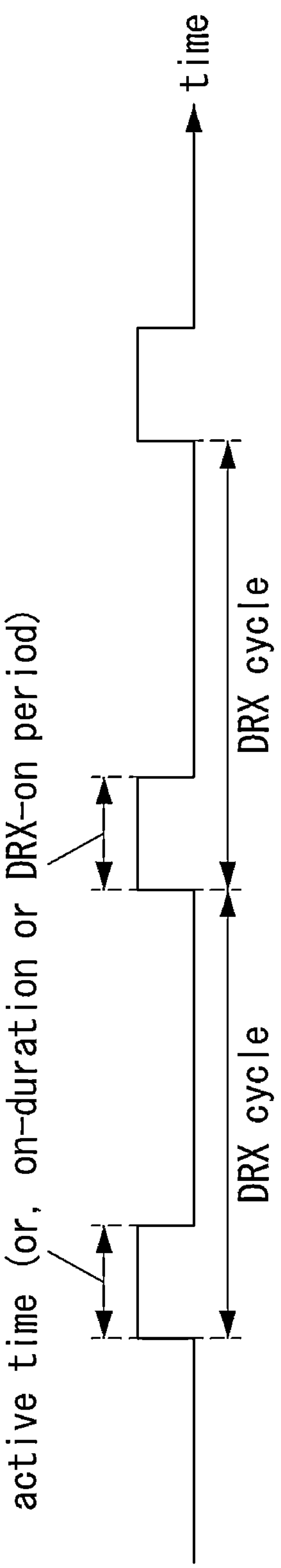
FIG. 3 is a conceptual diagram illustrating a first exemplary embodiment of a DRX operation method of a terminal.

Meanwhile, when the terminal always monitors downlink control channels (e.g., PDCCH) regardless of traffic presence, unnecessary power consumption of the terminal may occur. Accordingly, the terminal may perform a discontinuous reception (DRX) operation. FIG. 3 is a conceptual diagram illustrating a first exemplary embodiment of a DRX operation method of a terminal.

Referring to FIG. 3, a base station may transmit configuration information of a DRX cycle to a terminal. The terminal may receive the configuration information of the DRX cycle from the base station, and may identify the DRX cycle configured by the base station. The terminal may perform a PDCCH monitoring operation in an active time for each DRX cycle, and may omit the PDCCH monitoring operation in the remaining time period. The active time may also be referred to as an on-duration, a DRX-on period, and the like, and a time period other than the active time may be referred to as a DRX-off period, a DRX period, and the like.

The active time (e.g., DRX active time) may include an operation time of an on-duration timer, an operation time of a DRX inactivity timer, and/or the like. The on-duration timer may start at a start time of each DRX cycle. Alternatively, the on-duration timer may start at a time later by a predetermined offset than the start time of each DRX cycle. That is, a start time of the active time may coincide with the start time of the DRX cycle or may be later than the start time of the DRX cycle by a predetermined time offset. The terminal may regard a period from the start of the on-duration timer to an expiration time of the on-duration timer as the active time. In addition, when the DRX inactivity timer is set, the terminal may monitor PDCCHs for a predetermined time period from a time (e.g., slot, subframe, symbol) when a PDCCH is successfully received. That is, the DRX inactivity timer may be started or reset at a time (e.g., slot, subframe, symbol) when the terminal successfully receives a PDCCH. The terminal may regard a period from the start or reset time of the DRX inactivity timer to an expiration time of the DRX inactivity timer as the active time. The above-described timers may decrease by 1 for each reference time unit (e.g., slot, subframe, or symbol group). The timer may expire at a time (e.g., slot, subframe, or symbol group) when a value of the timer becomes 0. The symbol group may include one or more symbols.

According to the above-described operations, when the terminal successfully receives a PDCCH in an active time of a certain DRX cycle, the DRX inactivity timer of the terminal may be started, and the active time may be extended by the start of the DRX inactivity timer. On the other hand, when a PDCCH is not received during an active time of a certain DRX cycle, the terminal may enter a DRX-off state again at an expiration time of the on-duration timer. For example, the terminal may regard a period in which at least one of the on-duration timer and the DRX inactivity timer operates as the active time. In addition, the terminal may receive a medium access control (MAC) control element (CE) from the base station, and the MAC CE may instruct the terminal to enter a DRX-off period. In this case, the terminal may transition its operation mode to a DRX-off mode regardless of a value of the operating timer, and in this case, the on-duration timer and the DRX inactivity timer may be stopped. The above-described terms such as 'on-duration timer' and 'DRX inactivity timer' are merely examples, and may be substituted with any other terms for expressing the corresponding timer operations.

In addition to the above-described operations, a DRX operation of a communication node may refer to an operation in which the communication node does not receive signals in some time periods. In addition, a discontinuous transmission (DTX) operation of a communication node may refer to an operation in which the communication node does not transmit signals in some time periods. The above-described some time periods may refer to the inactive time, period outside the on-duration, off-period, sleep period, and/or the like for DRX or DTX.

In an exemplary embodiment, a DRX operation of a terminal may refer to an operation in which the terminal does not receive a signal (e.g., downlink signal) in a certain time period. The terminal may not receive a signal and may not perform a signal monitoring operation and/or blind decoding (or detection) operation in the time period. In addition, a DTX operation of a base station may refer to an operation in which the base station does not transmit a signal (e.g., downlink signal) in a certain time period. From the perspective of the terminal, the DRX operation of the terminal may correspond to the DTX operation of the base station. In the present disclosure, the DRX operation of the terminal and configuration (e.g., DRX cycle) related thereto may be used in the same or similar meaning as the DTX operation of the base station and configuration (e.g., DTX cycle) related thereto.

In an exemplary embodiments, a DTX operation of a terminal may refer to an operation in which the terminal does not transmit a signal (e.g., uplink signal) in a certain time period. In addition, a DRX operation of a base station may refer to an operation in which the base station does not receive a signal (e.g., uplink signal) in a certain time period. The base station may not receive a signal and may not perform a signal monitoring operation and/or blind decoding (or detection) operation in the time period. From the perspective of the terminal, the DTX operation of the terminal may correspond to the DRX operation of the base station. In the present disclosure, the DTX operation of the terminal and configuration (e.g., DTX cycle) related thereto may be used in the same or similar meaning as the DRX operation of the base station and configuration (e.g., DRX cycle) related thereto.

Meanwhile, the DTX operation of the base station may correspond to DRX operations of a plurality of terminals communicating with the base station. For example, a plurality of terminals may perform DRX operations in a DTX period of the base station. In addition, the DRX operation of the base station may correspond to DTX operations of a plurality of terminals communicating with the base station. For example, a plurality of terminals may perform DTX operations in a DRX period of the base station. Accordingly, the DTX of the base station may be used interchangeably with a cell DTX, serving cell DTX, TRP DTX, common DTX, DRX commonly applied to a terminal group, or the like, and the DRX of the base station may be used interchangeably with a cell DRX, serving cell DRX, TRP DRX, DTX commonly applied to a terminal group, or the like. In addition, in the present disclosure, 'active time' may refer to a DRX active time, a DTX active time, or both a DRX active time and a DTX active time, depending on the context.

The DRX operation may be classified into a DRX operation according to a long DRX cycle (hereinafter referred to as 'long DRX operation') and a DRX operation according to a short DRX cycle (hereinafter referred to as 'short DRX operation'). Only one of the long DRX operation and the short DRX operation may be performed. Alternatively, the long DRX operation and the short DRX operation may be performed in combination. The above-described operation may be performed for each DRX cycle. The above-described operation may be applied to a terminal in the RRC connected mode. Alternatively, the above-described operation may be applied to a terminal in the RRC idle mode or inactive mode. In addition, the above-described operation may be applied to a base station, serving cell, TRP, and the like.

As another method for improving power consumption of the terminal, a PDCCH monitoring operation of the terminal may be dynamically controlled. For example, when there is little traffic to be transmitted to the terminal, the base station may instruct the terminal to perform a monitoring operation on a small number of PDCCH candidates and/or a monitoring operation on PDCCH monitoring occasions (MOs) with a long periodicity. When there is a lot of traffic to be transmitted to the terminal, the base station may instruct the terminal to perform a monitoring operation on a large number of PDCCH candidates and/or a monitoring operation on PDCCH MOs with a short periodicity. The base station may dynamically instruct the terminal to perform the PDCCH monitoring operation through a signaling procedure (e.g., physical layer signaling, DCI, and/or the like), and the terminal may maintain the PDCCH monitoring operation or perform a changed PDCCH monitoring operation based on the above instruction. Specifically, the terminal may determine search space set(s) (or PDCCH MO(s) and/or CORESET(s)) to be monitored in each unit time (e.g., each slot, each slot group, each span, and each span group) based on the above instruction.

In order to support the above-described operation, the base station may configure one or more search space set group(s) (SSSG(s)) to the terminal. The terminal may receive configuration information of one or more SSSG(s) from the base station. The base station may control a PDCCH monitoring operation of the terminal in units of an SSSG. Each SSSG may include one or more search space set(s) (or CORESET(s), PDCCH candidate(s)). Alternatively, an SSSG may not include a search space set (or CORESET, PDCCH candidate), and the SSSG that does not include a search space set (or CORESET, PDCCH candidate) may be referred to as 'empty SSSG', 'null SSSG', or the like. The base station may transmit DCI indicative of monitoring one SSSG to the terminal. The terminal may identify that monitoring of one SSSG is indicated based on the DCI received from the base station. For example, the base station may configure a first SSSG and a second SSSG in the terminal, and may transmit DCI indicative of monitoring the first SSSG, which is one of the SSSGs, to the terminal. The terminal may receive configuration information of the first SSSG and the second SSSG from the base station, and may identify that monitoring of the first SSSG, which is one of the SSSGs, is indicated based on the DCI received from the base station. A time at which the indication is applied may be a period (e.g., first slot, first slot group, first span, first span group) appearing first after a predetermined time (e.g., N symbol(s)) elapses from a time when the terminal receives the DCI (e.g., the last symbol in which the DCI is received). That is, the terminal may monitor the first SSSG from the period (e.g., the slot, the span). In case that the terminal was monitoring another SSSG (e.g., the second SSSG different from the first SSSG) before the application time, the SSSG monitored by the terminal may be switched based on the application time. That is, the terminal may not monitor the another SSSG (e.g., the second SSSG different from the first SSSG) from the application time.

In addition, the terminal may switch the SSSG based on a timer operation. For example, the terminal may operate a timer (e.g., SSSG timer) from a time of switching to a certain SSSG, and may switch to a default SSSG at a time when the timer expires (e.g., a slot in which a value of the timer becomes 0 or a next slot of the corresponding slot). The default SSSG may be defined as an SSSG with a specific ID (e.g., ID=0). Alternatively, the default SSSG may be configured in the terminal by the base station. A value of the timer may be set by the base station to the terminal, and may be set to Y1 slot(s), Y2 ms, or the like. Each of Y1 and Y2 may be a natural number.

Alternatively, the base station may transmit DCI including information indicative of skipping a PDCCH monitoring operation for a predetermined period to the terminal. The terminal may receive the DCI from the base station, and may identify that a PDCCH monitoring operation is to be skipped for the predetermined period based on the information included in the DCI. The terminal may not perform a PDCCH monitoring operation in the identified period. The predetermined period may be referred to as a PDCCH monitoring skipping period. The base station may configure or indicate the length of the PDCCH monitoring skipping period to the terminal. The terminal may identify the length of the PDCCH monitoring skipping period according to the configuration or indication of the base station. A start time of the PDCCH monitoring skipping period may be determined based on a time when the DCI indicating the PDCCH monitoring skipping operation is received. An end time of the PDCCH monitoring skipping period may be determined based on information on the start time of the PDCCH monitoring skipping period and information on the length of the PDCCH monitoring skipping period. Alternatively, the end time of the PDCCH monitoring skipping period may be determined based on at least one of a specific DRX cycle, DRX active time, location of DRX active time, DRX on-duration, or location of DRX on-duration.

The terminal may not monitor any search space set in the PDCCH monitoring skipping period. Alternatively, the terminal may exceptionally monitor some search space set(s) (e.g., search space set(s) for monitoring a PDCCH having a CRC scrambled with SI/RA/P-RNTI, Type 0/0A/1/2 CSS set, and/or the like) even in the PDCCH monitoring skipping period. In addition, the terminal may receive information indicative of not performing a PDCCH monitoring operation for specific search space set(s) (e.g., specific SSSG) from the base station. In this case, the terminal may perform a PDCCH monitoring operation for search space set(s) irrelevant to the indication. That is, the base station may control the PDCCH monitoring skipping operation of the terminal in units of an SSSG.

The DCI indicating the PDCCH monitoring operation may be group common DCI (e.g., DCI format 2_0, or the like). In addition, the DCI indicating the PDCCH monitoring operation may be scheduling DCI (e.g., DCI for scheduling a PDSCH or DCI for scheduling a PUSCH). The DCI scheduling a PDSCH may have DCI formats 1_1, 1_2, and/or 1_0. The DCI scheduling a PUSCH may have DCI formats 0_1, 0_2, and/or 0_0. A DCI format used for indicating the PDCCH monitoring operation may be determined by a frequency band in which transmission is performed (e.g., a licensed band or an unlicensed band). Information on the indication of the PDCCH monitoring operation may be included in a specific field of the DCI. For example, information corresponding to code point(s) of the specific field may include at least one of information indicating an SSSG switching operation (or an operation of monitoring a specific SSSG) or information indicating a PDCCH monitoring skipping operation (or an operation of not monitoring a specific SSSG). When both the SSSG switching operation and the PDCCH monitoring skipping operation are configured in the terminal, the base station may dynamically select one of the SSSG switching operation and the PDCCH monitoring skipping operation, and may indicate the selected operation to the terminal.

Meanwhile, mobile data traffic may have unique characteristics and requirements according to an application service. For example, realistic service traffic such as extended reality (XR) may include real-time video information, and the video information may be periodically generated according to a scan rate. In addition, a high data rate may be required to support high-resolution videos in the XR service, and URLLC requirements may be satisfied to enable real-time interaction or immediate responses. In addition, since it may be difficult to mount a high-capacity battery in an XR terminal (e.g., a head mounted display (HMD)-type terminal, or the like), low-power operations of the terminal may be essentially supported.

The DRX operation may be effective in transmitting the above-described periodic traffic. The DRX cycle, active time (or on-duration), and the like of the terminal may be configured according to a periodic occurrence time of the traffic, and the terminal may perform a PDCCH monitoring operation or perform a downlink signal reception operation in an active time of each DRX cycle, and may periodically perform a transmission operation or a reception operation for traffic. The terminal may reduce unnecessary power consumption by not performing a PDCCH monitoring operation or a downlink signal reception operation in the remaining period (e.g., period outside the active time).

A scan rate of a video may be defined as frames per second (fps). For example, a video traffic having a scan rate of 120 fps may periodically occur every 1/120 second (i.e., 8.33 ms). On the other hand, a value of a DRX cycle may correspond to an integer number of subframes (e.g., 8 ms) or an integer number of slots. Therefore, it may be difficult to configure the DRX cycle to completely match the above-described XR traffic cycle. In addition, a random time error (e.g., jitter) may occur in a process of sensing and processing video information for the XR traffic. That is, a jitter may exist at a time of arrival (or occurrence) of the XR traffic, and the XR traffic may arrive at a time slightly earlier or slightly later than the periodic arrival time described above. Therefore, it may be difficult for the communication node (e.g., base station or terminal) to predict the exact arrival time of traffic.

When a jitter exists in the traffic, a problem may exist even if the active time of the terminal is configured according to the traffic occurrence cycle. For example, when traffic arrives earlier than an active time, transmission of the traffic may be delayed by a time required for the terminal to enter the active time and start a PDCCH monitoring operation or downlink signal reception operation. Conversely, when traffic occurs during an active time (i.e., a time later than the start of the active time), the active time may be extended, and accordingly, the terminal may consume as much power as the active time is extended.

As a method for solving the above-described problem, a method of dynamically changing (or determining) a location of the DRX active time of the terminal (or the DRX inactive time of the terminal, the DTX active time of the base station, and the DTX inactive time of the base station) may be used. That is, a location of a period in which the terminal performs a PDCCH monitoring operation may be dynamically changed (or determined). The terminal may receive a downlink signal (e.g., physical signal, physical channel) from the base station, and determine a start time of the active time based on the received signal (or information included in the received signal). In the present disclosure, the location of the DRX active time may refer to the start time and/or length of the DRX active time. The active time may be configured as a time period in units of milliseconds or a set of subframe(s). In this case, the start time of the active time may refer to a start time of the time period or the first-numbered subframe (or start time of the first-numbered subframe) constituting the set of subframe(s). Alternatively, the active time may configured as a set of slots, a set of symbols, a set of subslots, or a set of minislots. Alternatively, the active time may be configured as combinations of two or more of a set of slots, a set of symbols, a set of subslots, or a set of minislots. In this case, the start time of the active time may mean the first-numbered symbol, the first-numbered slot, the first-numbered subslot, the first-numbered minislot, and/or the like constituting the active time. In the present disclosure, the active time may refer to an active time of the next DRX cycle. Specifically, the active time may be an active time arranged in the next DRX cycle of the DRX cycle to which the received signal belongs.

The downlink signal may be a PDCCH, and the location of the DRX active time may be dynamically indicated by DCI included in the PDCCH or a DCI format of the DCI. For example, the DCI format may be a DCI format 2_6. Alternatively, the downlink signal may be a reference signal (e.g., CSI-RS) or a synchronization signal (e.g., SSS and/or PSS). The downlink signal may be used for not only indicating the location of the DRX active time to the terminal, but also instructing the terminal to transition from a DRX-off state to a DRX-on state and perform a PDCCH monitoring operation or a downlink signal reception operation in the DRX active time. In the present disclosure, the downlink signal may be referred to as a wake-up signal (WUS) for convenience. In the following exemplary embodiments, specific methods of dynamically changing, by using the WUS, the location of the DRX active time of the terminal, the DRX inactive time of the terminal, the DTX active time of the base station, the DTX inactive time of the base station, or the like (hereinafter collectively referred to as 'DRX active time of the terminal') will be described. In addition, the following exemplary embodiments may be commonly applied to a plurality of terminals based on common signaling (e.g., group common DCI) for a group of terminals.

As a first method, the base station may transmit a WUS including information on the location of the active time to the terminal, and the terminal may determine the location of the active time based on the WUS received from the base station. For example, the WUS may be a PDCCH, and the information on the location of the active time may be included in a payload of DCI transmitted by the PDCCH. Meanwhile, in a higher layer signaling procedure (e.g., RRC signaling procedure), the base station may configure one or more candidate(s) for the start time of the active time to the terminal. The terminal may identify the one or more candidate(s) for the start time of the active time through the higher layer signaling. The candidates for the start time (i.e., candidate start times) of the active time may correspond to codepoints of a field of the DCI, respectively. The base station may indicate one of the candidate start time(s) for the active time by transmitting the DCI to the terminal, and the terminal may regard the one candidate start time indicated by the DCI received from the base station as the start time of the active time. For another example, the WUS may be a reference signal or a synchronization signal, and the location of the active time may be distinguished by a plurality of sequences. For example, the base station may transmit a CSI-RS to the terminal based on a first sequence or a second sequence. When the CSI-RS is received based on the first sequence, the terminal may regard a first time corresponding to the first sequence as the start time of the active time of the next DRX cycle. When the CSI-RS is received based on the second sequence, the terminal may regard a second time corresponding to the second sequence as the start time of the active time of the next DRX cycle. A correspondence relationship between the sequences and the candidate start times may be configured by the base station to the terminal. The method described above may be referred to as (Method 100).

The base station may configure PDCCH monitoring occasion(s) for WUS monitoring to the terminal. The terminal may identify the PDCCH monitoring occasion(s) for WUS monitoring based on the configuration of the base station. In the present disclosure, the PDCCH monitoring occasion for WUS monitoring may correspond to a search space set for WUS monitoring. The PDCCH monitoring location for WUS monitoring may be referred to as 'WUS monitoring occasion', 'WUS instance', or the like. The WUS monitoring occasion(s) may correspond to one or more search space set(s) and one or more CORESET(s). The one or more search space set(s) may include a Type 3 CSS set.

The terminal may receive a WUS in at least one of the WUS monitoring occasion(s), and may determine the location of the active time of the next DRX cycle based on indication information included in the received WUS. For example, the base station may configure one WUS monitoring occasion to the terminal, and the terminal may identify the one WUS monitoring occasion configured by the base station. The terminal may receive the WUS in the WUS monitoring occasion, and may identify up to two locations (e.g., start times) of the active time based on the indication information included in the received WUS. For another example, the base station may configure a plurality of WUS monitoring occasions to the terminal, and the terminal may identify the plurality of WUS monitoring occasions configured by the base station. The terminal may receive a WUS in at least one of the WUS monitoring occasions, and may distinguish the plurality of locations (e.g., start times) of the active time based on the indication information included in the received WUS. Here, the number of the plurality of locations of the active time may be three or more.

On the other hand, the terminal may not receive a WUS in the WUS monitoring occasion(s) configured by the base station. This operation may correspond to a case when the base station does not transmit a WUS or a case when the base station transmits a WUS but the terminal fails to receive the WUS. In these cases, the terminal may determine the location of the active time based on information preconfigured by the base station and/or a predefined rule. For example, when a WUS is not received, the terminal may determine one of the candidate start time(s) of the active time configured by the base station as the start time of the active time of the next DRX cycle. For example, when a WUS is not received, the terminal may determine the latest start time among the candidate start time(s) configured for the terminal as the start time of the active time of the next DRX cycle. The terminal may perform a PDCCH monitoring operation or a downlink signal reception operation from the determined start time. In this case, when a plurality of candidate active times having the same start time are configured in the terminal, the terminal may select one candidate active time from among the plurality of candidate active times according to a predetermined criterion, and regard the selected candidate active time as the active time of the next DRX cycle. For example, the operation in which the terminal selects one candidate active time may be performed based on comparison of indexes of the candidate active times, lengths of the candidate active times, and the like.

As a second method, the terminal may determine the location of the active time based on a time at which a WUS is received. To support this operation, the base station may configure a plurality of WUS monitoring occasion groups to the terminal, and the terminal may identify the plurality of WUS monitoring occasion groups configured by the base station. The terminal may monitor a WUS in WUS monitoring occasions belonging to the plurality of WUS monitoring occasion groups. In the present disclosure, the WUS monitoring occasion group may have a meaning corresponding to an SSSG for WUS monitoring (e.g., WUS SSSG). Each WUS monitoring occasion group may include one or more WUS monitoring occasions (or one or more search space set(s)). In an exemplary embodiment, each WUS monitoring occasion group may consist of one WUS monitoring occasion (or one search space set). The WUS monitoring occasion group may be referred to as 'WUS search space set group'. In addition, the WUS monitoring occasion groups and the locations (e.g., start times) of the active time may be combined with (or associated with) each other. The base station may transmit configuration information of the association relationship to the terminal through a signaling procedure (e.g., RRC signaling), and the terminal may receive the configuration information of the association relationship from the base station through the signaling procedure. Based on the association relationship, the terminal may apply the active time or the location (e.g., start time) of the active time, which is associated with the WUS monitoring occasion group in which the WUS is received, to the next DRX cycle, and may perform a PDCCH monitoring operation or a downlink signal reception operation in the corresponding active time. The method described above may be referred to as (Method 110).

Figure 4:
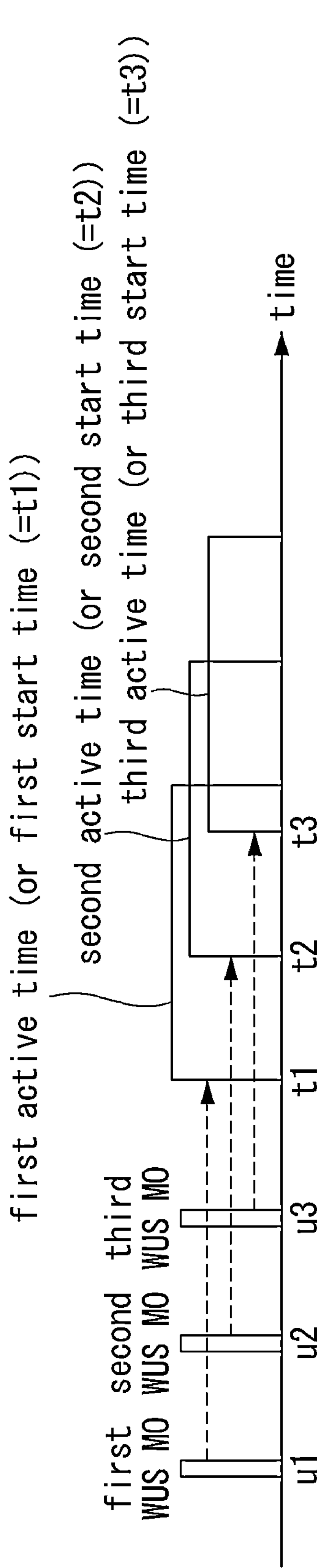
FIG. 4 is a conceptual diagram illustrating a first exemplary embodiment of a method for dynamically changing a DRX active time.

FIG. 4 is a conceptual diagram illustrating a first exemplary embodiment of a method for dynamically changing a DRX active time.

Referring to FIG. 4, a terminal may be configured by a base station to monitor first, second, and third WUS monitoring occasions at times u1, u2, and u3, respectively.

The base station may transmit, to the terminal, configuration information instructing the terminal to respectively monitor the first, second, and third WUS monitoring occasions at the time u1, u2, and u3. The terminal may receive the configuration information from the base station, and based on the configuration information, the terminal may identify that the operation of respectively monitoring the first, second, and third WUS monitoring occasions at the times u1, u2, and u3 is indicated. The respective WUS monitoring occasions may be included in different WUS monitoring occasion groups. For example, the first, second, and third WUS monitoring occasions may belong to first, second, and third WUS monitoring occasion groups, respectively. In addition, each WUS monitoring occasion may correspond to a different active time (or start time of the active time). For example, the first, second, and third WUS monitoring occasions may be associated with the first, second, and third active times (or start times of first, second, and third active times), respectively. In FIGS. 4, t1, t2, and t3 may refer to the start times (e.g., start slot, the first-numbered symbol of the start slot, or the like) of the first, second, and third active times, respectively. According to (Method 110), the terminal may perform a PDCCH monitoring operation or a downlink signal reception operation in the active time associated with the WUS monitoring occasion group in which a WUS is received. For example, when the terminal receives a WUS in the first WUS monitoring occasion, the terminal may perform a PDCCH monitoring operation or a downlink signal reception operation in the first active time (or from the first start time) associated with the first WUS monitoring occasion in the next DRX cycle.

In the above-described methods (e.g., (Method 100) and (Method 110)), the start time of the active time may be determined by a time offset from a reference time. As one method for determining the start time of the active time, the reference time may be a time at which the terminal receives the WUS, and the start time of the active time may be a time after a predetermined time elapses from the time at which the terminal receives the WUS. Specifically, the reference time may be a symbol (e.g., the last symbol or the first-numbered symbol) in which the PDCCH monitoring occasion in which the WUS is received is arranged, and the start time of the active time may be a slot appearing first after a predetermined time (e.g., L symbols) elapses from the symbol. Alternatively, the reference time may be a slot in which the PDCCH monitoring occasion in which the WUS is received is arranged, and the start time of the active time may be a slot later by K slot(s) than the slot. The method described above may be referred to as (Method 111). In the above-described exemplary embodiment, the terminal may receive the WUS in the third WUS monitoring occasion. In this case, the terminal may regard a slot (e.g., the first-numbered symbol of the corresponding slot) appearing first after a predetermined time (e.g., L symbols) elapses from a symbol (e.g., the last symbol or the first symbol) to which the third WUS monitoring occasion is allocated as the start time of the active time. Alternatively, the terminal may regard a slot (e.g., the first-numbered symbol of the slot) later by K slot(s) than the slot to which the third WUS monitoring occasion is allocated as the start time of the active time.

Alternatively, the terminal may regard a time resource (e.g., the last symbol, the first-numbered symbol, or slot) where one of the monitoring occasions constituting the WUS monitoring occasion group in which the WUS is received is arranged as a reference time, and may regard a time (e.g., slot or symbol) after X slot(s) and/or Y symbol(s) from the time resource as the start time of the active time. The one monitoring occasion may refer to a monitoring occasion having the latest (or earliest) monitoring occasion, a monitoring occasion having the latest end symbol (or start symbol), or a monitoring occasion having the earliest start symbol (or end symbol) among monitoring occasion(s) constituting the WUS monitoring occasion group. The method described above may be referred to as (Method 112). (Method 111) may be one exemplary embodiment of (Method 112). That is, when each WUS monitoring occasion group is composed of one WUS monitoring occasion, (Method 112) may be equivalent to (Method 111).

Figure 5A:
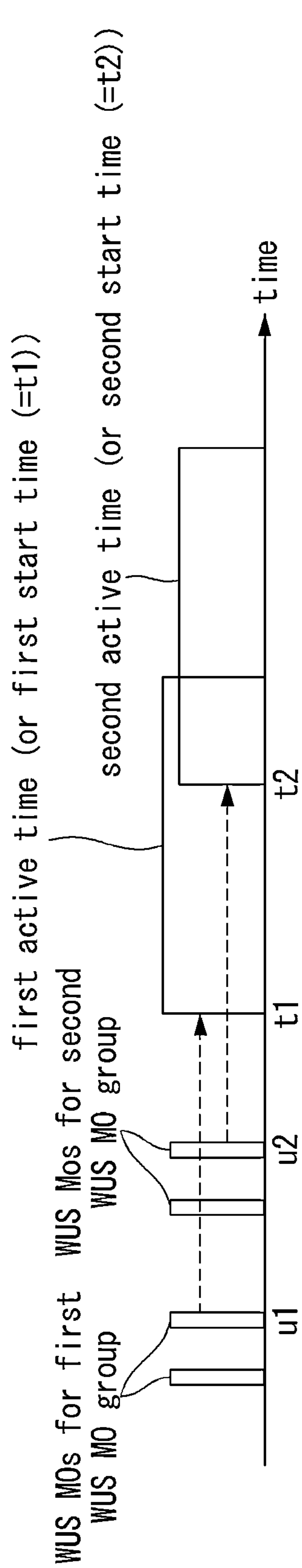
FIG. 5A is a conceptual diagram illustrating a second exemplary embodiment of a method for dynamically changing a DRX active time.
Figure 5B:
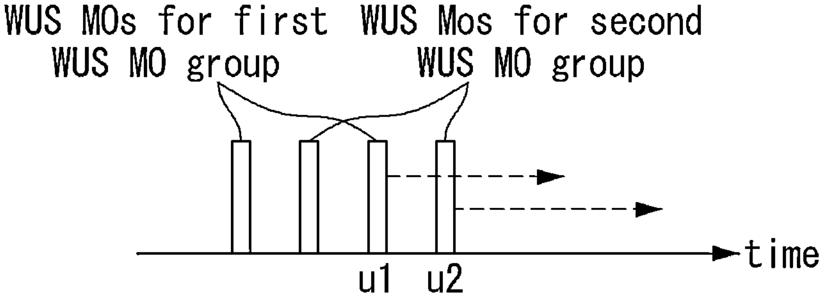
FIG. 5B is a conceptual diagram illustrating a third exemplary embodiment of a method for dynamically changing a DRX active time.
Figure 5C:
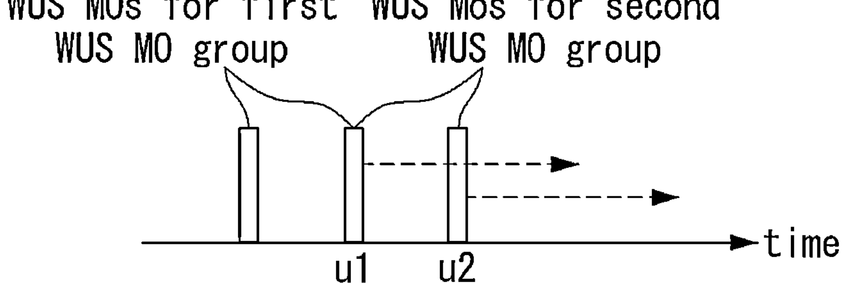
FIG. 5C is a conceptual diagram illustrating a third exemplary embodiment of a method for dynamically changing a DRX active time.

FIG. 5A is a conceptual diagram illustrating a second exemplary embodiment of a method for dynamically changing a DRX active time, FIG. 5B is a conceptual diagram illustrating a third exemplary embodiment of a method for dynamically changing a DRX active time, and FIG. 5C is a conceptual diagram illustrating a third exemplary embodiment of a method for dynamically changing a DRX active time.

Referring to FIGS. 5A to 5C, a base station may configure first and second WUS monitoring occasion groups to a terminal. The terminal may identify the first and second WUS monitoring occasion groups configured by the base station. Each of the first and second WUS monitoring occasion groups may include two WUS monitoring occasions. The terminal may perform a PDCCH monitoring operation for WUS reception in the WUS monitoring occasions, and may receive a WUS in one WUS monitoring occasion group. In this case, the terminal may regard a slot appearing first at a time when or after a predetermined time elapses from a time resource (e.g., the last symbol) of one (e.g., the latest) monitoring occasion among WUS monitoring occasions belonging to the corresponding WUS monitoring occasion group (e.g., the WUS monitoring occasion group in which the WUS is received). For example, the terminal may receive the WUS in one WUS monitoring occasion in the first WUS monitoring occasion group, and may determine the active time of the next DRX cycle based on a time resource (i.e., u1) of the latest WUS monitoring occasion belonging to the first WUS monitoring occasion group.

Referring to the third exemplary embodiment of FIG. 5B, monitoring occasions of the first WUS monitoring occasion group and monitoring occasions of the second WUS monitoring occasion group may be arranged alternately in the time domain. Considering that arrival times of XR traffic are reflected in the temporal arrangement of the WUS monitoring occasions, the above-described alternate arrangements may not be preferable. Accordingly, restrictions may be applied to configuration of the WUS monitoring occasion groups. For example, as shown in FIG. 5A, all WUS monitoring occasions of the first WUS monitoring occasion group may be configured to be ahead or not to be later than all WUS monitoring occasions (e.g., end symbol or start symbol) of the second WUS monitoring occasion group. The first WUS monitoring occasion group and the second WUS monitoring occasion group may share the same repetition periodicity, and the above-described condition may be applied within one period.

Referring to the fourth exemplary embodiment of FIG. 5C, a WUS monitoring occasion belonging to the first WUS monitoring occasion group (hereinafter referred to as 'first WUS monitoring occasion') and a WUS monitoring occasion belonging to the second WUS monitoring occasion group (hereinafter referred to as 'second WUS monitoring occasion') may overlap in time. For example, a first search space set corresponding to the first WUS monitoring occasion and a second search space set corresponding to the second WUS monitoring occasion may be arranged in the same symbol set. A first PDCCH candidate belonging to the first search space set and a second PDCCH candidate belonging to the second search space set may be mapped to the same CCE(s), and at least one of the same scrambling, the same RNTI, or the same DCI format may be applied to the CCE(s). When a PDCCH (e.g., WUS) is received in the CCE(s) based on at least one of the same scrambling, the same RNTI, or the same DCI format, it may be difficult that the terminal determines whether the PDCCH corresponds to the first PDCCH candidate (i.e., the first WUS monitoring occasion group) or the second PDCCH candidate (i.e., the second WUS monitoring occasion group). Therefore, even when a WUS is successfully received, it may be difficult for the terminal to determine the active time corresponding to the received WUS.

As a method for solving the ambiguity problem, the terminal may not expect that WUS monitoring occasions (or search space sets, PDCCH candidates) belonging to different WUS monitoring occasion groups temporally overlap. In exemplary embodiments, the above-described overlap may mean a full overlap. The terminal may not expect that symbol sets to which the WUS monitoring occasions are mapped fully coincide. The symbol sets to which the WUS monitoring occasions are mapped are allowed to be overlapped partially (i.e., in some symbols). In addition, the terminal may expect that the WUS monitoring occasions are configured such that at least one of a condition in which PDCCH candidates corresponding to the WUS monitoring occasions are mapped to different CCE(s) or a condition in which at least one of different scrambling, different RNTIs, or different DCI formats is applied to the CCE(s) is satisfied. For example, PDCCHs corresponding to different WUS monitoring occasion groups may have CRCs scrambled by different RNTIs, and the corresponding PDCCHs may be transmitted. The terminal may determine which WUS monitoring occasion group a received PDCCH belongs to on the basis of an RNTI used for reception of the PDCCH. For another example, PDCCHs corresponding to different WUS monitoring occasion groups may be scrambled based on different scrambling IDs, and the terminal may determine which WUS monitoring occasion group a received PDCCH belongs to on the basis of a scrambling ID used for descrambling in a reception procedure of the PDCCH.

Alternatively, when the WUS is received in the CCE(s) of PDCCH candidates with ambiguity as described above, the terminal may consider that the WUS is received in a PDCCH candidate (e.g., one WUS monitoring occasion group corresponding to the PDCCH candidate). The one WUS monitoring occasion group may be predefined in the technical specification. For example, the one WUS monitoring occasion group may have a WUS monitoring occasion group having a low index (e.g., the lowest index) or a high index (e.g., the highest index) among WUS monitoring occasion groups. The one WUS monitoring occasion group may be a WUS monitoring occasion group including the latest (or earliest) WUS monitoring occasion among the WUS monitoring occasion groups. Alternatively, the one WUS monitoring occasion group may be configured by the base station to the terminal.

In the above-described method, the terminal may expect to receive the WUS from at most one WUS monitoring occasion group. That is, the terminal may not expect to receive the WUS in a plurality of WUS monitoring occasion groups. When the terminal does not receive the WUS in any WUS monitoring occasion group, the terminal may determine the location of the active time based on information preconfigured by the base station and/or a predefined rule as described above. On the other hand, the terminal may receive the WUS in a plurality of WUS monitoring occasion groups. In this case, the terminal may select one preconfigured or predefined WUS monitoring occasion group, and apply an active time (or a start time and a length of the active time) associated with the selected WUS monitoring occasion group to the next DRX cycle, and perform a PDCCH monitoring operation or a downlink signal reception operation. Alternatively, the terminal may perform a PDCCH monitoring operation or a downlink signal reception operation in a time period obtained by summing active times associated with the plurality of WUS monitoring occasion groups.

According to the above-described methods (e.g., (Method 100), (Method 111), and (Method 112)), the active time may be determined regardless of the DRX cycle (or periodicity). For example, the terminal may not receive configuration information of the DRX cycle (or periodicity) from the base station. That is, the base station may not configure the DRX cycle (or periodicity) to the terminal. The terminal may determine the active time based on configuration information of the WUS monitoring occasion or WUS monitoring occasion group, whether a WUS is received or not, a WUS reception resource, and/or the like.

On the other hand, when the DRX cycle (or periodicity) is configured to the terminal, the above-described methods may be applied to the terminal. In this case, the terminal may select one of the DRX cycle (e.g., a start time of the DRX cycle), a WUS monitoring time, or a WUS reception time, and may determine the active time based on the selected time. The terminal may select the time based on whether a WUS is received or not. For example, when the terminal successfully receives a WUS, the terminal may determine the active time of the next DRX cycle based on a monitoring time and/or reception time of the WUS. When a WUS is not received, the terminal may determine the active time based on the DRX cycle (e.g., the start time of the DRX cycle).

Alternatively, a reference time for determining the active time may be a semi-statically configured time (e.g., a specific slot, a specific subframe, a specific symbol, or the like). For example, the reference time for determining the active time may be a start time of the semi-statically configured DRX cycle (or a start time of the semi-statically configured active time). For example, the reference time may be a start slot or a start subframe of the DRX cycle (or a slot or subframe at which the active time starts). The reference time may be configured to the terminal through an RRC signaling procedure. The active time may be a time shifted by a predetermined offset from the reference time. The predetermined offset (e.g., time offset) may be slot(s), subframe(s), symbol(s), or the like. The method described above may be referred to as (Method 113).

In (Method 113), a plurality of time offsets may be configured to the terminal. The plurality of time offsets may be associated with the above-described WUS monitoring occasion groups, respectively. The time offsets and the WUS monitoring occasion groups may correspond one-to-one. For example, the terminal may receive configuration information of first and second WUS monitoring occasion groups and first and second time offsets from the base station, and may receive from the base station configuration information indicating that the first and second WUS monitoring occasion groups are respectively associated with the first and second time offsets. When the terminal receives a WUS in the first WUS monitoring occasion group, the terminal may regard a time shifted by the first time offset from the reference time (e.g., the start time of the DRX cycle) as the start time of the active time. When the terminal receives a WUS in the second WUS monitoring occasion group, the terminal may regard a time shifted by the second time offset from the reference time (e.g., the start time of the DRX cycle) as the start time of the active time.

In the above-described method, the length (i.e., duration) of the active time may be determined by the WUS received by the terminal or the WUS monitoring occasion group (or WUS monitoring occasion) in which the terminal receives the WUS. For example, first and second durations for the active time may be configured to the terminal. When the terminal receives the WUS in the first (or second) WUS monitoring occasion group, the terminal may regard the first (or second) duration as the length of the active time, and perform a PDCCH monitoring operation or a downlink signal reception operation for the duration. Alternatively, the duration of the active time may correspond to an on-duration timer value (e.g., initial value). For example, a first value and a second value for the on-duration timer of the active time may be configured to the terminal, and the terminal may set the on-duration timer in the active time based on a timer value corresponding to the WUS monitoring occasion group in which the WUS is received so as to operate the on-duration timer.

In the above-described method, the operation of the terminal, which is performed within the active time, may be determined by the WUS received by the terminal or the WUS monitoring occasion group (or WUS monitoring occasion) in which the terminal receives the WUS. According to an exemplary embodiment, search space set(s) monitored by the terminal within the active time or a start period (e.g., the first-numbered slot or slot(s) including the first-numbered slot) of the active time may be determined by the WUS received by the terminal or the WUS monitoring occasion group (or WUS monitoring occasion) in which the terminal receives the WUS. For example, a first SSSG and a second SSSG may be configured to the terminal. When the terminal receives a WUS in the first (or second) WUS monitoring occasion group, the terminal may monitor the corresponding first (or second) SSSG in the active time corresponding to the WUS or the WUS monitoring occasion group in which the WUS is received. The terminal may perform a PDCCH monitoring operation for the search space set(s) or SSSG until the terminal receives an indication for a separate PDCCH monitoring switching operation.

According to another exemplary embodiment, a set of signal(s) and/or channel(s) received by the terminal, a set of signal(s) and/or channel(s) transmitted by the terminal, a BWP activated, a numerology used, and/or the like in the active time or the start period (e.g., the first-numbered slot or slot(s) including the first-numbered slot) may be determined by the WUS received by the terminal or the WUS monitoring occasion group (or, WUS monitoring occasion) in which the terminal receives the WUS.

The above-described method may be applied to all DRX cycles. Alternatively, the above-described method may be applied to some DRX cycles. For example, a monitoring periodicity of the WUS search space set(s) may be set to be longer than the DRX cycle, and the method described above may be applied to the DRX cycle (or, the next DRX cycle) in which the WUS search space set(s) (i.e., the WUS monitoring location(s)) are configured.

In the above-described method, when the terminal receives a WUS in a certain WUS monitoring occasion, the terminal may skip a WUS monitoring operation in the remaining WUS monitoring occasion(s). Specifically, the terminal may skip the WUS monitoring operation in the WUS monitoring occasion group(s) other than the WUS monitoring occasion group to which the WUS monitoring occasion in which the WUS is received belongs. The terminal may perform the WUS monitoring operation in the remaining WUS monitoring occasion(s) included in the WUS monitoring occasion group to which the WUS monitoring occasion in which the WUS is received belongs.

In the above-described method, the start time of the active time may be determined in units of symbols. For example, according to (Method 113), the active time may start at a location shifted by M symbols from the reference time. In this case, the active time may start from one symbol located in the middle of a slot rather than the first-numbered symbol of the slot. In other words, the first-numbered slot of the active time may be a partial slot rather than a full slot.

Figure 6:
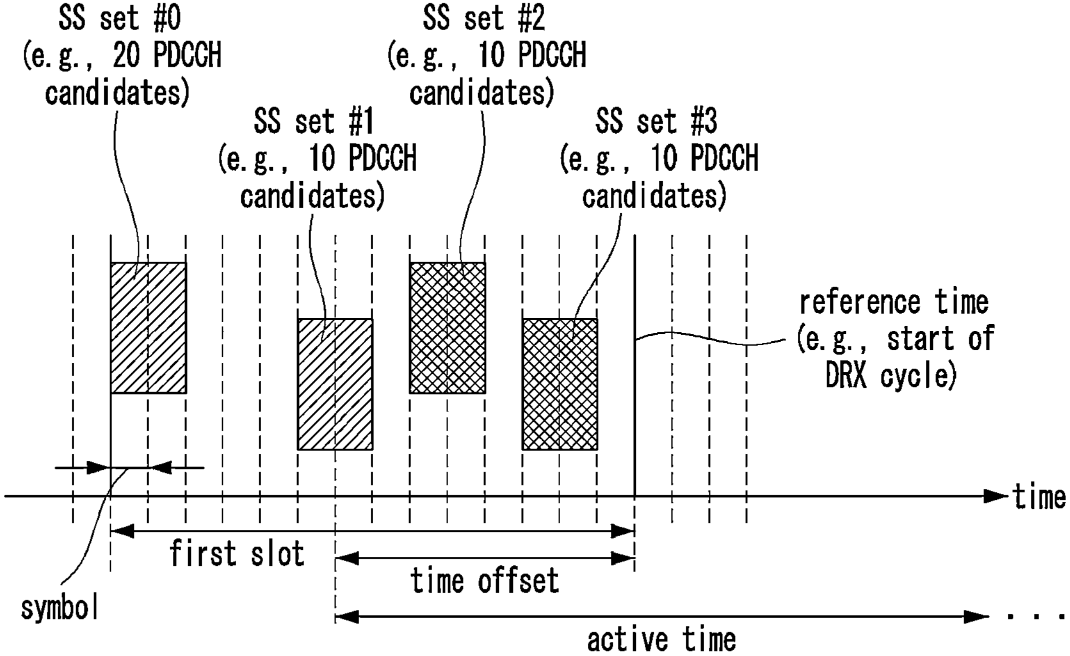
FIG. 6 is a conceptual diagram illustrating a first exemplary embodiment of a PDCCH monitoring method in the first-numbered slot of the active time.

FIG. 6 is a conceptual diagram illustrating a first exemplary embodiment of a PDCCH monitoring method in the first-numbered slot of the active time.

Referring to FIG. 6, a terminal may determine a time ahead by a time offset (e.g., 8 symbols) from a reference time (e.g., the start time of the DRX cycle) as the start time of the active time according to the above-described method. That is, the active time may start from the seventh symbol of the first slot. In the first slot, search space sets #0, #1, #2, and #3 may be configured in the terminal, and the search space sets #0, #1, #2, and #3 may include 20, 10, 10, and 10 PDCCH candidates, respectively.

The number of PDCCH candidates that the terminal can monitor (e.g., blind-decode) in one slot may be limited. For example, the terminal can monitor up to C1 PDCCH candidates in each slot and process up to C2 CCEs occupied by PDCCH candidates. In an exemplary embodiment, C1=44 and C2=56. When the number of PDCCH candidates configured in a certain slot exceeds C1 or the number of CCEs configured in the certain slot exceeds C2, the terminal may sequentially map search space sets according to a prioritization rule until the number of PDCCH candidates or the number of CCEs do not exceed C1 or C2. The terminal may perform the PDCCH monitoring operation in the mapped search space sets, and may skip the PDCCH monitoring operation in the unmapped search space sets.

In an exemplary embodiment, the total number of PDCCH candidates included in search space sets configured in the first slot may be 50. In this case, the number of PDCCH candidates may be greater than the upper limit of C1=44. The terminal may map the search space sets #0, #1, and #2 to the first slot in descending order of search space set IDs until the number of PDCCH candidates does not exceed C1, and may not map the search space set #3 to the first slot. The terminal may monitor the search space set #2 mapped within the active time among the mapped search space sets. The search space set #3 may not be monitored by the terminal even though it is allocated within the active time. Accordingly, a PDCCH capacity may decrease and a scheduling delay may occur in the first-numbered slot (i.e., the first slot) of the active time.

In order to solve the above-described problem, the search space set mapping rule of the terminal may be changed. When a certain slot included in the active time is a partial slot, the terminal may perform an operation of sequentially mapping search space sets with respect to search space sets included (e.g., fully included) in the active time. The search space sets not included in the active time may be excluded from the mapping procedure. In an exemplary embodiment, the search space sets #0 and #1 that are not included in the active time may be excluded in the mapping procedure, and with respect to the search space sets #2 and #3 included in the active time, the terminal may map the search space sets to the first slot in descending order of IDs of the search space sets until the number of PDCCH candidates does not exceed C1. As a result, the terminal may map the search space sets #2 and #3 to the first slot, and may perform a PDCCH monitoring operation in the mapped search space sets. Accordingly, a PDCCH capacity can be secured in the first-numbered slot (i.e., the first slot) of the active time.

The terminal may monitor the search space sets in the active time. In this case, the terminal may monitor the same search space sets based on the same search space set configuration regardless of the location of the active time (e.g., the start location and/or length of the active time). For a certain DRX configuration, the search space set(s) monitored by the terminal in the DRX active time may be constant regardless of the location (e.g., start time and/or length) of the DRX active time.

In addition, a signal defined or configured so that the terminal performs a transmission/reception operation of the signal within the active time may be mapped to be partially included in the active time. When the terminal does not perform a reception operation or transmission operation of a signal in a period outside the active time, the terminal may also not perform a reception or transmission operation of a signal partially included in the active time. For example, an active time of a certain DRX cycle may start from the second symbol of a resource of a PDSCH or PUSCH scheduled for the terminal. According to the above-described method, the terminal may not perform an operation of receiving the PDSCH or transmitting the PUSCH within the active time. In addition, the terminal may not perform the operation of receiving the PDSCH or transmitting the PUSCH even in a period outside the active time.

Figure 7:
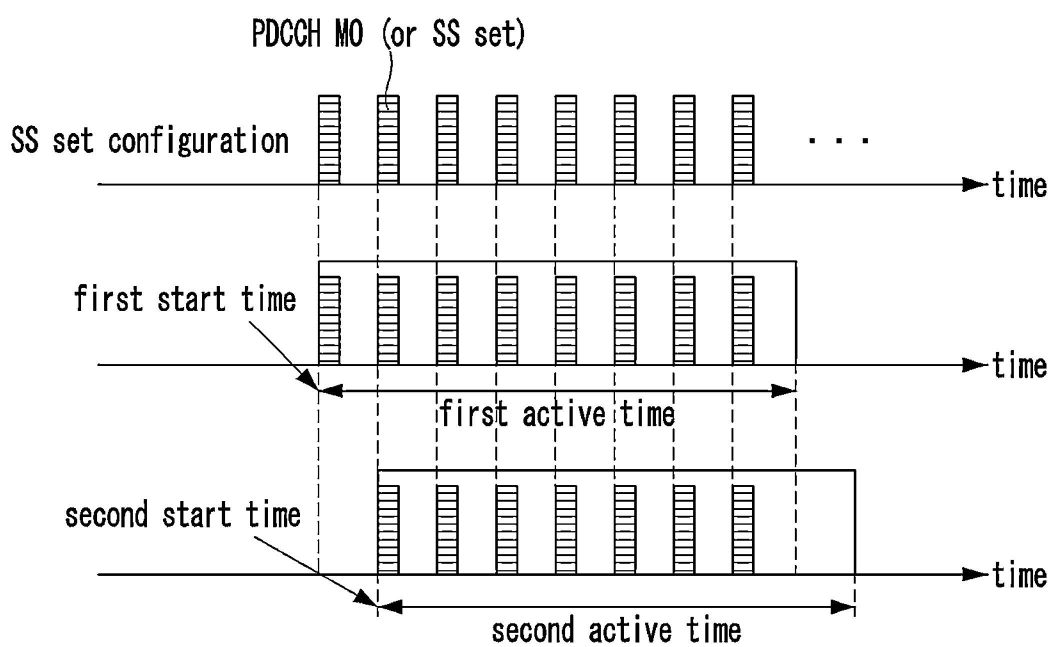
FIG. 7 is a conceptual diagram illustrating a first exemplary embodiment of a search space set configuration method for dynamic change of an active time.

FIG. 7 is a conceptual diagram illustrating a first exemplary embodiment of a search space set configuration method for dynamic change of an active time.

Referring to FIG. 7, a terminal may receive configuration information of search space set(s) from a base station, and based on the configuration information, the terminal may monitor the search space sets (or PDCCH monitoring occasions) in a DRX active time. According to the method described above, the active time may be dynamically indicated to the terminal so as to start at a first start time or a second start time. In other words, a first active time or a second active time may be dynamically indicated. In this case, the terminal may equally monitor the configured search space sets (or PDCCH monitoring occasions) in the active time regardless of from which time among the first and second start times the active time starts.

According to the above-described exemplary embodiment, the base station may configure a union of search space sets corresponding to the first start time of the active time (or first active time) and search space sets corresponding to the second start time of the active time (or second active time) in the terminal, and the terminal may perform a PDCCH monitoring operation for the configured union in the active time. Accordingly, the terminal may perform more blind decoding operations than the number of blind decodings required for traffic transmission, and the complexity of the terminal may increase.

As a method for solving the above-described problem, the terminal may receive configuration information of search space sets for each candidate active time (e.g., location of the active time, candidate start time and/or candidate length of the active time) from the base station.

Figure 8:
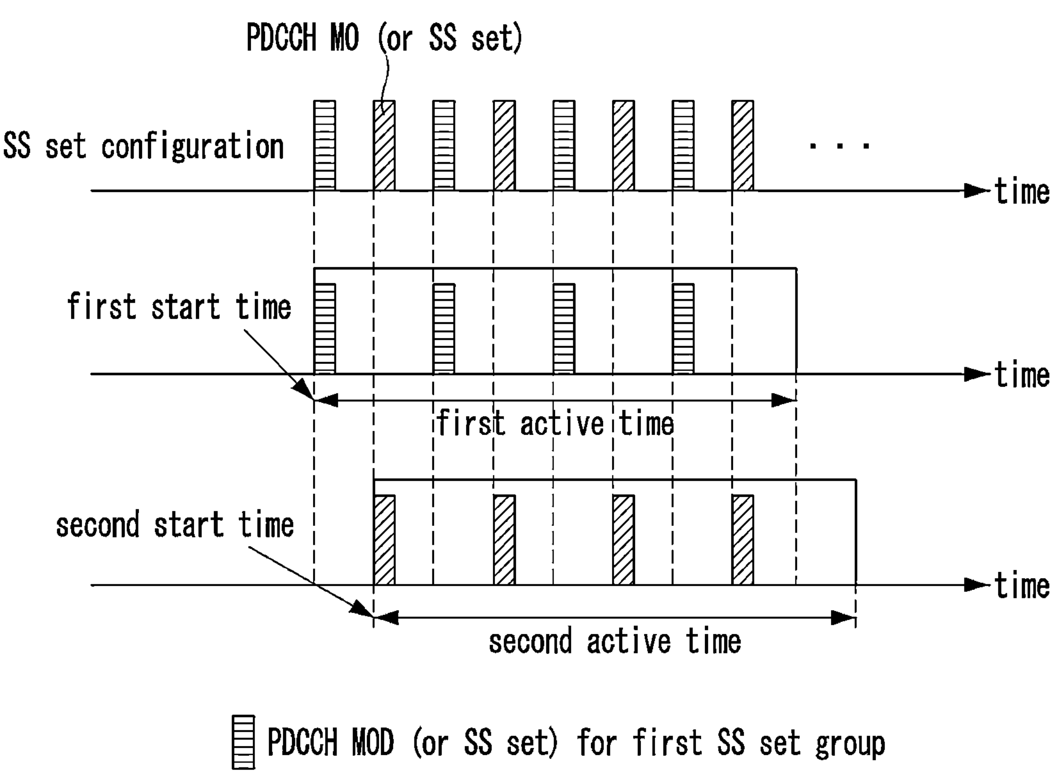
FIG. 8 is a conceptual diagram illustrating a second exemplary embodiment of a search space set configuration method for dynamic change of an active time.

FIG. 8 is a conceptual diagram illustrating a second exemplary embodiment of a search space set configuration method for dynamic change of an active time.

Referring to FIG. 8, a terminal may receive, from a base station, configuration information of a first search space set group (e.g., first SSSG) and configuration information of a second search space set group (e.g., second SSSG). The first search space set group (e.g., first SSSG) and the second search space set group (e.g., second SSSG) may be associated with different candidate active times (e.g., different candidate start times and/or or different candidate lengths), respectively. For example, the first SSSG may be associated with the first start time of the active time (or, first active time), and the second SSSG may be associated with the second start time of the active time (or, second active time). When the active time starts at one of the first start time and the second start time according to an indication from the base station, the terminal may select one of the first SSSG and the second SSSG based on the above-described association relationship, and may monitor the search space sets (or PDCCH monitoring occasions) belonging to the selected SSSG in the active time.

Alternatively, the terminal may receive configuration information of search space sets from the base station, may temporally-shift the configured search space sets (i.e., corresponding PDCCH monitoring occasions) according to an active time (e.g., start time and/or length of the active time) indicated by the base station, and may monitor the shifted search space sets in the active time. A value for the shifting (i.e., shift value) may be set for each candidate active time dynamically indicatable (e.g., candidate start time and/or candidate length of the active time). A configuration unit of the shift value may be a slot, symbol, minislot, subslot, span, or subframe. The shift value may include 0. The shift value may be applied based on an originally-configured location (e.g., slot or symbol) to which the search space set is mapped.

Figure 9:
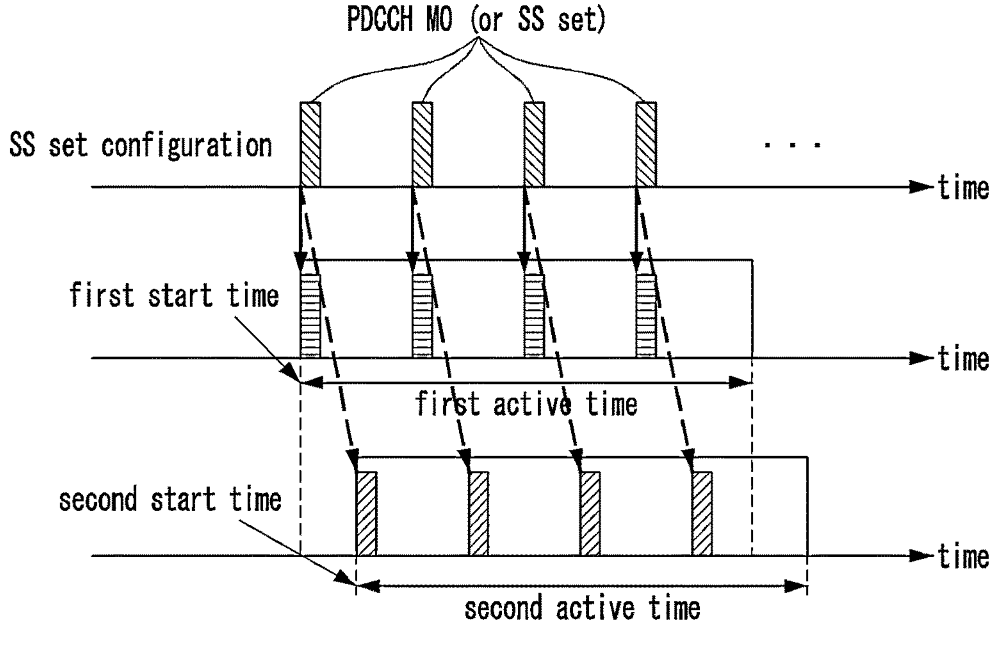
FIG. 9 is a conceptual diagram illustrating a third exemplary embodiment of a search space set configuration method for dynamic change of an active time.

FIG. 9 is a conceptual diagram illustrating a third exemplary embodiment of a search space set configuration method for dynamic change of an active time.

Referring to FIG. 9, a terminal may receive configuration information of search space sets from a base station. The terminal may receive, from the base station, information on shift values of the search space sets (i.e., corresponding PDCCH monitoring occasions) for each of a plurality of candidate active times (e.g., candidate start times and/or candidate lengths of the active times). For example, the base station may configure a first value and a second value as the shift values to the terminal, and the terminal may identify the shift values (e.g., the first value and the second value) configured by the base station. The first value may be associated with the first start time of the active time (or the first active time), and the second value may be associated with the second start time of the active time (or the second active time). When the active time starts at one of the first start time and the second start time according to an indication from the base station, the terminal may select one shift value among the first value and the second value based on the above-described association relationship, may shift time resource locations of the search space sets (i.e., corresponding PDCCH monitoring occasions) by the selected shift value, and may monitor the shifted search space sets (i.e., shifted corresponding PDCCH monitoring occasions) in the active time. According to exemplary embodiments, the configured search space sets may mean an SSSG, and the terminal may temporally shift the SSSG (i.e., temporally shift PDCCH monitoring occasions belonging to the SSSG) by the above-described method, and may monitor the shifted SSSG.

The shift value may be determined based on other information or other parameter values transmitted from the base station to the terminal instead of being explicitly configured to the terminal. For example, a shift value of a search space set corresponding to each candidate start time of the active time may be determined by the each candidate start time (or a shift value of the each candidate start time). Alternatively, the each candidate start time of the active time (or a shift value of the each candidate start time) may be used as a reference time for mapping the search space set corresponding to the each candidate start time.

According to exemplary embodiments, SSSGs monitored by the terminal in the active time may be associated with SSSGs for WUS monitoring (i.e., WUS SSSGs and WUS monitoring occasion groups). For example, the terminal may receive configuration information of one or more WUS SSSGs. The terminal may receive configuration information of one or more SSSGs for PDCCH monitoring in the active time (hereinafter, referred to as 'active time SSSGs'). In this case, each WUS SSSG may be associated with at least one active time SSSG(s). Additionally or alternatively, each active time SSSG may be associated with at least one WUS SSSG(s). The terminal may receive configuration information on the association relationship from the base station through a signaling procedure (e.g., RRC signaling procedure). According to exemplary embodiments, the WUS SSSGs and the active time SSSGs may correspond one-to-one. The number of WUS SSSGs configured in the terminal and the number of active time SSSGs configured in the terminal may be the same. Based on the association relationship, when the terminal successfully receives a WUS in a certain WUS SSSG, the terminal may perform a PDCCH monitoring operation in SSSG(s) associated with the WUS SSSG in which the WUS is received in an active time (e.g., start period of the active time) of the next DRX cycle. Alternatively, the SSSGs monitored by the terminal in the active time may be associated with the active time (or start time and/or length of the active time) selected (or determined) by the terminal through reception of the WUS. Based on the association relationship, the terminal may monitor the SSSG associated with the active time (or a start time and/or length of the active time) selected (or determined) based on the received WUS in the active time of the next DRX cycle (e.g., a start period of the active time).

According to the above-described exemplary embodiments, the DRX operation and the DTX operation of the terminal may be commonly applied to a plurality of terminals based on common signaling (e.g., group common DCI) for a terminal group. In addition, the plurality of terminals may skip not only a PDCCH monitoring operation but also a downlink signal reception operation in the DRX cycle, and may skip an uplink signal transmission operation in the DTX cycle. That is, according to the present disclosure, a plurality of terminals (e.g., all terminals) belonging to a serving cell or TRP may not perform a reception operation and/or a transmission operation in a common time period, and as an operation correspond thereto, the base station may not perform a transmission operation and/or a reception operation in the corresponding period. Accordingly, power consumption of the base station (or network) may be reduced. The above-described operation may be referred to as 'group DRX', 'group DTX', or the like. The group DRX may correspond to a serving cell DTX, cell DTX, TRP DTX, or the like, and the group DTX may correspond to a serving cell DRX, cell DRX, TRP DRX, or the like. On the other hand, a DRX operation and a DTX operation applied to each terminal individually (i.e., terminal-specifically) may be respectively referred to as 'terminal-specific (or UE-specific) DRX' and 'terminal-specific (or UE-specific) DTX' to distinguish them from the group DRX and the group DTX. In the present disclosure, unless otherwise noted, the DRX may refer to both the group DRX and the UE-specific DRX, and the DTX may refer to both the group DTX and the UE-specific DTX.

The terminal may not receive downlink signals in a DRX inactive time (or a period outside the active time, off-duration, etc.). For example, the base station may not transmit a PDCCH, PDSCH, DM-RS, CSI-RS, TRS, PRS, PT-RS, and/or the like to the terminal in the DRX inactive time (or cell DTX inactive time) of the terminal. The terminal may not receive the downlink signals in the DRX inactive time. Specifically, the terminal may not receive a specific PDSCH (e.g., a PDSCH including unicast data, a PDSCH including a downlink-shared channel (DL-SCH), a PDSCH scheduled by DCI transmitted in a USS set) in the DRX inactive time. Alternatively, the terminal may receive some downlink signals from the base station regardless of whether they are included in the DRX active time. For example, the terminal may receive an initial access signal (e.g., SSB, a PDSCH including an SIB-1, a PDCCH corresponding to the SIB-1, Msg2, Msg4, MsgB, and/or the like) in the DRX inactive time. For another example, the terminal may receive a signal (e.g., SSB, CSI-RS, TRS, PRS, and/or the like) for synchronization, CSI measurement, beam quality measurement, positioning, sensing, and/or the like in the DRX inactive time. For another example, the terminal may receive a periodic signal (e.g., SSB, periodic or semi-persistent CSI-RS, SPS PDSCH, and/or the like) in the DRX inactive time. Alternatively, whether to receive the above-described signal(s) in the DRX inactive time may be configured to the terminal based on a signaling procedure from the base station.

Similarly, the terminal may not transmit uplink signals in a DTX inactive time (or a period outside the active time, off-duration, or the like). For example, the terminal may not transmit a PUCCH, PUSCH, DM-RS, SRS, PT-RS, etc. to the base station in the DTX inactive time. The base station may not receive the uplink signals in the DRX inactive time (or cell DRX inactive time). Specifically, the terminal may not transmit a specific PUSCH (e.g., a PUSCH including unicast data, a PUSCH including an uplink-shared channel (UL-SCH), a PUSCH scheduled by DCI transmitted in a USS set) in the DTX inactive time. Alternatively, the terminal may transmit some uplink signals to the base station regardless of whether they are included in the DTX active time. For example, the terminal may transmit an initial access signal (e.g., PRACH, MsgA PUSCH, Msg3, HARQ-ACK which is a reception response to Msg4, and/or the like) in the DTX inactive time. For another example, the terminal may transmit a signal (e.g., PRACH, SRS, etc.) for uplink synchronization, CSI measurement, beam quality measurement, positioning, and sensing in the DTX inactive time. For another example, the terminal may transmit a periodic signal (e.g., periodic or semi-persistent SRS, configured grant (CG) PUSCH, and/or the like) in the DTX inactive time. Alternatively, whether to transmit the above-described signals in the DTX inactive time may be configured to the terminal based on a signaling procedure from the base station.

The terminal may request an uplink resource by transmitting a scheduling request (SR) to the base station for transmission of uplink traffic. The SR may be transmitted in an uplink resource (e.g., PUCCH or PUSCH). After transmitting the SR, the terminal may receive DCI by performing a PDCCH monitoring operation, and may identify an uplink resource (e.g., PUSCH) scheduled by the DCI. However, according to the present disclosure, the terminal may operate in the DRX inactive time after transmitting the SR, and may not receive DCI for scheduling an uplink resource despite transmitting the SR.

As a method for solving the above-described problem, the terminal may receive downlink signals during a predetermined time period after transmitting the SR. In addition, the terminal may perform a PDCCH monitoring operation during the predetermined time period. The terminal may perform a downlink signal reception operation or a PDCCH monitoring operation in the time period even when the time period belongs to the inactive time. Alternatively, the terminal may regard the time period as an active time, and may receive DCI for scheduling a PUSCH by performing a signal reception operation and a PDCCH monitoring operation for an active time in the time period. Alternatively, the terminal may extend the active time (e.g., DRX active time) based on a time at which the SR is transmitted, and receive DCI for scheduling a PUSCH in the extended active time. For example, the terminal may initialize the DRX inactivity timer in a slot in which the SR is transmitted (or the next slot thereof).

In addition, the terminal may transmit an uplink signal during a predetermined time period after transmitting the SR. The terminal may transmit an uplink signal in the time period even when the time period belongs to the inactive time. Alternatively, the terminal may regard the time period as an active time, and may transmit a PUSCH by performing a signal transmission operation for an active time in the time period. Alternatively, the terminal may extend the active time (e.g., DTX active time) based on a time at which the SR is transmitted, and transmit a PUSCH in the extended active time. For example, the terminal may initialize the DTX inactivity timer in a slot in which the SR is transmitted (or the next slot thereof).

In addition to the above-described operation, the terminal may transmit the SR in the inactive time (e.g., DTX inactive time). That is, an uplink resource (e.g., PUCCH or PUSCH) for transmitting the SR may be regarded as an active resource or a valid resource even in the inactive time. The base station may receive a signal by monitoring (or blind-decoding) an SR transmission resource of the terminal even in the inactive time. Through this, even under DTX/DRX operations, uplink performance degradation of the terminal may be mitigated.

The time period may have a duration (e.g., N consecutive slots, where N is a natural number). A start time of the time period may be determined as a time immediately after the time at which the SR is transmitted (e.g., the next slot of the slot in which the SR is transmitted) or a time after a predetermined time offset elapses from the time at which the SR is transmitted (e.g., M-th slot after the slot in which the SR is transmitted, where M is a natural number).

The terminal may receive configuration information of a signal set composed of downlink signal(s) from the base station, and may receive downlink signal(s) belonging to (or not belonging to) the signal set in the inactive time. In addition, the terminal may receive configuration information of a signal set composed of uplink signal(s) from the base station, and may transmit uplink signal(s) belonging to (or not belonging to) the signal set in the inactive time. The terminal may receive configuration information of a plurality of signal sets (e.g., candidate signal sets) from the base station, and receive information indicative of performing a transmission and reception operation in the inactive time based on at least of the plurality of signal sets configured by the base station.

Meanwhile, signals (e.g., PDCCH, PDSCH, PUCCH, PUSCH) repeatedly transmitted in a plurality of slots may be considered for the DTX/DRX operation of the terminal.

Figure 10:
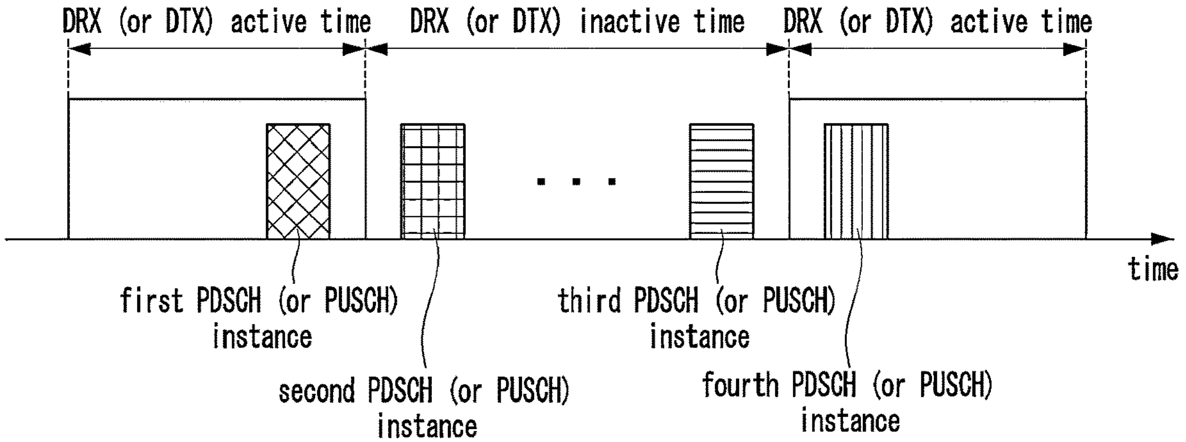
FIG. 10 is a conceptual diagram illustrating a first exemplary embodiment of a PDSCH repeated transmission method under DRX operations.

FIG. 10 is a conceptual diagram illustrating a first exemplary embodiment of a PDSCH repeated transmission method under DRX operations.

Referring to FIG. 10, a terminal may configure a DRX active time and a DRX inactive time based on DRX configuration information received from a base station, and perform a DRX operation. In addition, the terminal may receive scheduling information of repeated PDSCH transmission from the base station. The repeated PDSCH transmission may consist of a plurality of PDSCH instances (or a plurality of PDSCHs, a plurality of PDSCH repetitions) including the same TB (or TB(s) in some multi-layer transmissions). The plurality of PDSCH instances may be transmitted in the same slot or in different slots. Referring to FIG. 10, the terminal may receive scheduling information of repeated PDSCH transmission composed of a first PDSCH instance and a second PDSCH instance. In this case, only the first PDSCH instance, which is a part of the repeated PDSCH transmission, may be included in the active time, and the second PDSCH instance may be included in the inactive time. In this case, the terminal may receive only the first PDSCH instance belonging to the active time and may not receive the second PDSCH instance belonging to the inactive time. Alternatively, when some PDSCH instance(s) constituting the repeated PDSCH transmission belong to the active time, the terminal may receive all PDSCH instances constituting the repeated PDSCH transmission. That is, the terminal may receive both the first PDSCH instance and the second PDSCH instance. As another method, when a specific PDSCH instance (e.g., the first PDSCH instance, the earliest PDSCH instance) constituting the repeated PDSCH transmission belongs to the active time, the terminal may receive all PDSCH instances constituting the repeated PDSCH transmission. That is, the terminal may receive both the first PDSCH instance and the second PDSCH instance. According to the above-described method, PDSCH reception performance may be improved. However, a DTX operation period of the base station may be reduced, and network power efficiency may be reduced. As a method for increasing network power efficiency, the terminal may not receive all PDSCH instances constituting repeated PDSCH transmission when some PDSCH instance(s) constituting the repeated PDSCH transmission belong to the active time.

The above-described method may be equally applied to repeated PDCCH transmission. For example, in the above-described exemplary embodiment, the repeated PDSCH transmission and the PDSCH instances may correspond to repeated PDCCH transmission and PDCCH candidates, respectively. In this case, the PDCCH candidates that are repeatedly transmitted may belong to different search space sets, and may belong to different CORESETs or the same CORESET. In addition, the above-described method may be equally applied to repeated uplink transmission of the terminal performing DTX operations. For example, in the above-described exemplary embodiment, the DRX may correspond to DTX, and the repeated PDSCH transmission and the PDSCH instances may correspond to repeated PUSCH/PUCCH transmission and PUSCH/PUCCH instances, respectively.

In a similar context, HARQ retransmission may be considered in the DTX/DRX operation of the terminal. The terminal may receive a PDSCH or transmit a PUSCH. If the reception or transmission fails, the base station may schedule a retransmission PDSCH or a retransmission PUSCH to the terminal. The retransmission PDSCH or retransmission PUSCH may be scheduled in the inactive time. In this case, the terminal may receive the retransmission PDSCH or transmit the retransmission PUSCH even in the inactive time. The HARQ retransmission operation may be performed by a timer. When a reception response for a previously received PDSCH is NACK, the terminal may operate (or start) the timer after determining NACK or transmitting NACK to the base station, and until the timer expires, the terminal may monitor a PDCCH or receive a downlink signal (e.g., PDSCH) for retransmission of the PDSCH. In addition, the terminal may operate (or start) the timer after transmitting a PUSCH, and until the timer expires, the terminal may monitor a PDCCH or transmit an uplink signal (e.g., PUSCH) for retransmission of the PUSCH. The terminal may regard a time period during which the timer operates as an active time. When a previously transmitted PDSCH or PUSCH is dynamically scheduled by DCI, a possibility that a corresponding retransmission PDSCH or retransmission PUSCH belongs to an inactive time may be low according to the above-described timer (e.g., DRX inactivity timer) operation. However, the previously transmitted PDSCH or PUSCH may be an SPS PDSCH or CG PUSCH, respectively, and the corresponding retransmission PDSCH or retransmission PUSCH may belong to an inactive time. Therefore, reception performance of the PDSCH or PUSCH may be improved by the above-described DRX operation.

Meanwhile, a multi-flow traffic composed of a sum of a plurality of traffics may be transmitted to or from the terminal. For example, a communication node supporting the XR service may collect various video information, convert the various video information into packets having periodicities, and transmit the converted packets. Each video information may correspond to each traffic (or flow), and the periodicities of the traffics may be independent.

A plurality of DRX configurations (or a plurality of DRX operations and/or a plurality of DRX cycles) may be configured to the terminal for transmission of the multi-flow traffic. For example, the terminal may receive information on a first DRX configuration corresponding to a first flow having a first periodicity and information on a second DRX configuration corresponding to a second flow having a second periodicity from the base station. The information on the first DRX configuration and the information on the second DRX configuration may each include information elements about a DRX cycle (or periodicity), an offset of a start time of an active time, the length of the active time (e.g., on-duration timer), a DRX inactivity timer, and/or the like. The information elements may be configured independently for the first DRX configuration and the second DRX configuration. Alternatively, at least some of the information elements may be identically (or commonly) configured for the first DRX configuration and the second DRX configuration.

A plurality of DRX configurations or a plurality of DTX configurations configured in the terminal may be activated simultaneously. That is, the terminal may consider all of the plurality of DRX configurations or the plurality of DTX configurations as valid, and may perform an operation corresponding to each DRX configuration or each DTX configuration by the above-described method. Alternatively, only some of the plurality of DRX configurations or the plurality of DTX configurations configured in the terminal (e.g., one DRX configuration or one DTX configuration) may be activated in each time period. The terminal may consider only some DRX configuration(s) or some DTX configuration(s) (e.g., one DRX configuration or one DTX configuration) as valid in the corresponding time period, and may perform operations corresponding to the some DRX configuration(s) or some DTX configuration(s) (e.g., one DRX configuration or one DTX configuration) by the above-described method. To selectively activate/deactivate DRX configuration(s) or DTX configuration(s), the base station may transmit a signaling message (e.g., MAC CE, DCI, RRC message) including corresponding information to the terminal.

The terminal may receive configuration information for both DRX configuration and DTX configuration. In this case, DRX configuration and DTX configuration configured in the terminal may be regarded as being activated at the same time. The terminal may consider that both the DRX configuration and the DTX configuration are valid, and may perform both an operation corresponding to the DRX configuration and an operation corresponding to the DTX configuration by the method described above. The configuration information of the DRX configuration and the configuration information of the DTX configuration may be included in the same message (or the same message group), and the same message may be transmitted to the terminal. In addition, activation/deactivation of the DRX configuration and activation/deactivation of the DTX configuration may be simultaneously indicated to the terminal by the same message (or the same message group). DRX configuration information (e.g., DRX cycle, DRX on-duration, DRX active time, timer information for DRX operation) and DTX configuration information (e.g., DTX cycle, DTX on-duration, DTX active time, timer information for DTX operation) may be independently determined by the base station without association. Accordingly, for one terminal, a DRX active time may overlap with a DTX active time and/or a DTX inactive time, and a DTX active time may overlap with a DRX active time and/or a DRX inactive time.

The terminal may perform a WUS monitoring operation and a wake-up operation for a plurality of DRX configurations (e.g., activated DRX configurations). For example, the terminal may receive configuration information of WUS monitoring occasion(s) for each of the first DRX configuration and the second DRX configuration. The WUS monitoring occasion(s) may be associated with one of the first DRX configuration or the second DRX configuration. A set of WUS monitoring occasion(s) associated with each DRX configuration may be referred to as a WUS monitoring occasion group (or WUS SSSG). For example, a first WUS monitoring occasion group and a second WUS monitoring occasion group may be associated with the first DRX configuration and the second DRX configuration, respectively. Based on the association relationship, the terminal may perform a DRX operation (e.g., an operation of determining an active time of the next DRX cycle and monitoring a PDCCH in the determined active time) corresponding to the DRX configuration associated with the WUS monitoring occasion group in which a WUS is received. In addition, the WUS monitoring occasion(s) may be associated with a plurality of DRX configuration(s). In this case, the terminal may perform a wake-up operation for a plurality of DRX configurations associated with the WUS monitoring occasion(s) (or WUS monitoring occasion group) in which the WUS is received, and may perform a DRX operation (e.g., an operation of determining an active time of the next DRX cycle and monitoring a PDCCH in the determined active time) corresponding to the plurality of DRX configurations.

PDCCH monitoring operations for the first WUS monitoring occasion group and the second WUS monitoring occasion group may be performed independently of each other. Configuration of a search space set, CORESET, and/or the like for the first WUS monitoring occasion group and configuration of a search space set, CORESET, and/or the like for the second WUS monitoring occasion group may be independent of each other. Each of the configurations (i.e., configuration of the search space set, CORESET, and/or the like) may be associated with each DRX configuration. When performing a plurality of DRX operations corresponding to a plurality of flows, the terminal may receive configuration information of a search space set, CORESET, and/or the like for WUS monitoring for each DRX operation.

Figure 11:
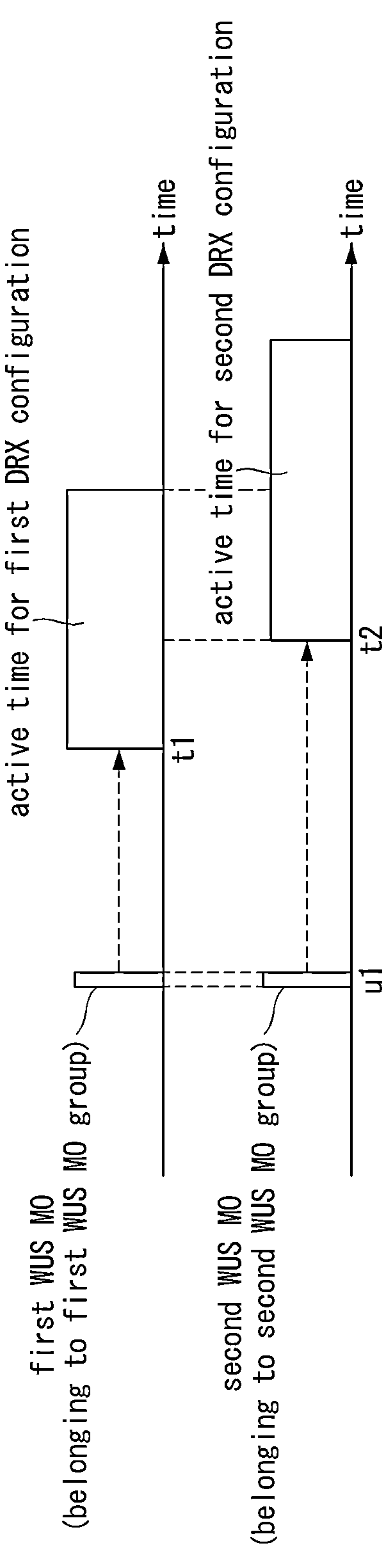
FIG. 11 is a conceptual diagram illustrating a first exemplary embodiment of a WUS monitoring method for a plurality of DRX configurations.

FIG. 11 is a conceptual diagram illustrating a first exemplary embodiment of a WUS monitoring method for a plurality of DRX configurations.

Referring to FIG. 11, a terminal may receive information on a plurality of DRX configurations (e.g., a first DRX configuration and a second DRX configuration) from a base station. The terminal may receive configuration information of a first WUS monitoring occasion for a DRX operation based on the first DRX configuration and a second WUS monitoring occasion for a DRX operation based on the second DRX configuration. The terminal may determine an active time for each DRX operation based on reception of a WUS in each WUS monitoring occasion, and may perform a PDCCH monitoring operation in the determined active time. The first WUS monitoring occasion may be included in a first WUS monitoring occasion group configured in the terminal, and the second WUS monitoring occasion may be included in a second WUS monitoring occasion group configured in the terminal.

The first WUS monitoring occasion and the second WUS monitoring occasion may overlap in time. A first PDCCH candidate included in the first WUS monitoring occasion (or a first PDCCH candidate included in a search space set corresponding to the first WUS monitoring occasion) and a second PDCCH candidate included in the second WUS monitoring occasion (or a second PDCCH candidate included in a search space set corresponding to the second WUS monitoring occasion) may be mapped to the same CCE(s). The same scrambling may be applied to the same CCE(s). At least one of the same RNTI or the same DCI format may be applied to the PDCCH candidates. When a PDCCH (e.g., WUS) is received based on at least one of the same scrambling, the same RNTI, or the same DCI format in the CCE(s), it may be difficult for the terminal to identify whether the received PDCCH is the first PDCCH or the second PDCCH. Accordingly, it may be difficult for the terminal to determine for which DRX configuration among the plurality of DRX configurations to perform a wake-up operation, and accordingly, the terminal may perform an operation unintended by the base station.

As a method for solving the above-described problem, PDCCHs respectively associated with the plurality of DRX configurations may be distinguished by different identifiers. The identifier may be a scrambling ID, RNTI, and/or DCI format. For example, the terminal may perform monitoring of a PDCCH associated with the first DRX configuration and monitoring of a PDCCH associated with the second DRX configuration based on different scrambling IDs, different RNTIs, and/or different DCI formats. For example, a CRC of the PDCCH associated with the first DRX configuration may be scrambled by a first C-RNTI, and a CRC of the PDCCH associated with the second DRX configuration may be scrambled by a second C-RNTI.

Alternatively, when a PDCCH (e.g., WUS) is received based on at least one of the same scrambling, the same RNTI, or the same DCI format in the CCE(s), the terminal may regard the received PDCCH as one of the first PDCCH and the second PDCCH, and perform a wake-up operation for DRX configuration associated with the one PDCCH. The terminal may perform an operation of considering the received PDCCH as one of the first PDCCH and the second PDCCH based on a predefined prioritization rule or a configuration from the base station. For example, the terminal may select one of the first PDCCH and the second PDCCH based on configuration information of the first PDCCH and the second PDCCH, configuration information of corresponding search space sets (e.g., search space set types, search space set IDs), and/or configuration information of corresponding CORESETs (e.g., CORESET IDs), and/or related DRX configuration information (e.g., DRX configuration IDs or indexes). Alternatively, when a PDCCH (e.g., WUS) is received based on at least one of the same scrambling, the same RNTI, or the same DCI format in the CCE(s), the terminal may perform wake-up operations for all DRX configurations associated with the first PDCCH and the second PDCCH. That is, the terminal may consider that both the first PDCCH and the second PDCCH are received.

As another method, the base station may configure the search space set(s) and CORESET(s) for WUS monitoring such that the PDCCH candidates belonging to the first WUS monitoring occasion group and the PDCCH candidates belonging to the second WUS monitoring occasion group do not satisfy the above-mentioned ambiguity condition(s). The terminal may not expect that the PDCCH candidates belonging to the first WUS monitoring occasion group and the PDCCH candidates belonging to the second WUS monitoring occasion group satisfy the above-described ambiguity condition(s).

Figure 12:
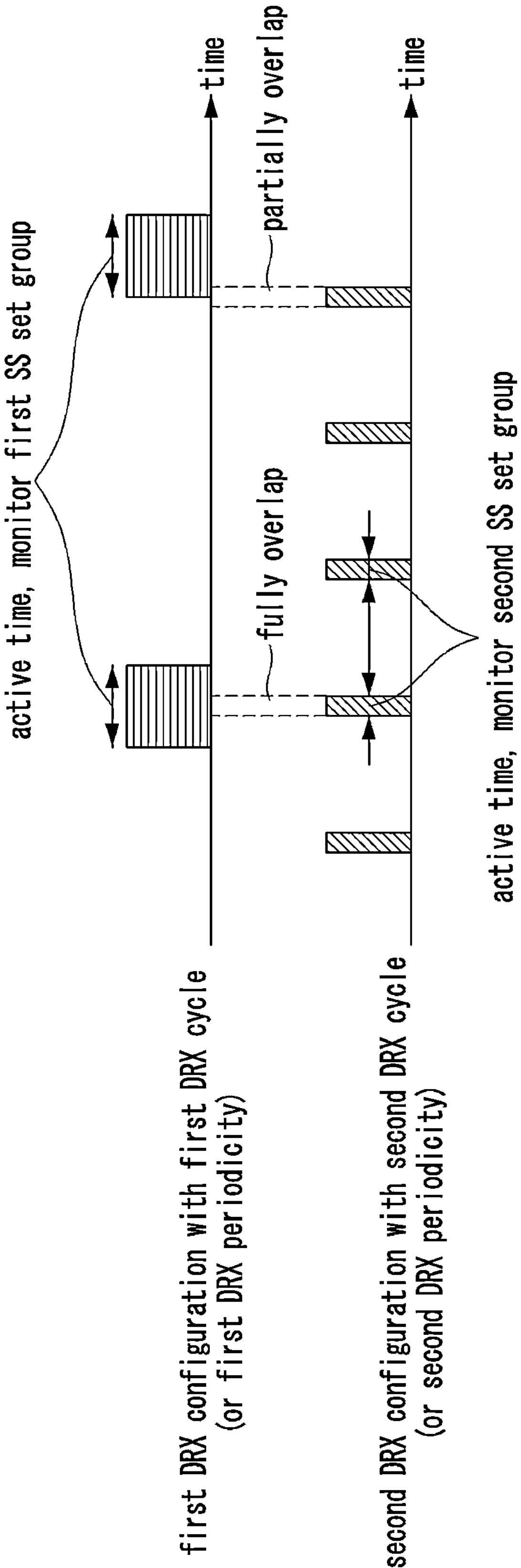
FIG. 12 is a conceptual diagram illustrating a first exemplary embodiment of a PDCCH monitoring method based on a plurality of DRX configurations.

FIG. 12 is a conceptual diagram illustrating a first exemplary embodiment of a PDCCH monitoring method based on a plurality of DRX configurations.

Referring to FIG. 12, a terminal may receive information on a plurality of DRX configurations from a base station, and perform a PDCCH monitoring operation based on the plurality of DRX configurations. An active time (or on-duration) of a first DRX configuration may appear periodically based on a first DRX cycle (or first DRX periodicity), and an active time (or on-duration) of a second DRX configuration may appear periodically based on a second DRX cycle (or second DRX periodicity). The first DRX cycle (or first DRX periodicity) and the second DRX cycle (or second DRX periodicity) may have different values. For example, the first DRX configuration may be configuration for a general PDCCH monitoring operation of the terminal and may be configured with a relatively long periodicity. On the other hand, the second DRX configuration may be configuration for periodic transmission of specific traffic (e.g., XR traffic), and may be configured with a periodicity corresponding to an occurrence (or arrival) periodicity of the XR traffic. For example, the second DRX cycle (or second DRX periodicity) may be shorter than the first DRX cycle (or first DRX periodicity).

The terminal may monitor different search space set(s) (or corresponding CORESET(s), corresponding PDCCH monitoring occasion(s)) for the plurality of DRX configurations. That is, the terminal may monitor a first search space set group in an active time of the first DRX configuration, and monitor a second search space set group in an active time of the second DRX configuration. For example, the second search space set group may be configured to include only minimum PDCCH candidate(s) for periodic transmission of specific traffic (e.g., XR traffic). For example, the second search space set group may include one USS set having the same monitoring periodicity as an occurrence periodicity of the XR traffic. On the other hand, the first search space set group may include not only search space sets for unicast transmission but also search space sets (e.g., Type 0/0A/1/2 CSS set, Type 3 CSS set, and/or the like) for transmitting DCI for scheduling common information or broadcast information. The first search space set group and the second search space set group may include the same search space set(s). The search space set(s) monitored by the terminal for each DRX configuration may be signaled from the base station to the terminal.

An active time of a certain cycle of the first DRX configuration and an active time of a certain cycle of the second DRX configuration may overlap in time. In this case, the terminal may monitor both the search space set(s) for the first DRX configuration and the search space set(s) for the second DRX configuration in the overlapping period. According to the above-described method, a PDCCH monitoring complexity of the terminal may increase in the corresponding period. The terminal may skip a monitoring operation for some search space set(s) in the period (i.e., overlapping period) according to a prioritization rule. For example, while the maximum number of blind decodings (BDs) that the terminal can perform in a slot included in a plurality of DRX active times is not exceeded, the terminal may sequentially map the search space sets one by one in consideration of priorities of the search space sets between the DRX configurations, and may monitor the mapped search space set(s) in the slot.

Alternatively, the terminal may monitor only the search space set(s) for one of the first DRX configuration and the second DRX configuration based on a prioritization between the DRX configurations. To support this operation, a priority or a priority indicator may be configured for each DRX configuration. The priority may be configured directly by an explicit RRC message or parameter. Alternatively, the priority may be configured indirectly by association with other configuration(s). The DRX configuration for which a priority is not configured may follow a predefined priority (e.g., default priority). The default priority may correspond to the lowest priority.

In addition to a PDCCH monitoring resource set, downlink signal sets received (or not received) by the terminal in an inactive time may also be configured independently of each other for a plurality of DRX configurations. For example, the terminal may receive (or not receive) a first downlink signal set in the inactive time of the first DRX configuration, and may receive (or not receive) a second downlink signal set in the inactive time of the second DRX configuration. The first DRX configuration and the second DRX configuration may be activated simultaneously. When the inactive time of the first DRX configuration and the inactive time of the second DRX configuration overlap, the terminal may receive (or not receive) both the first downlink signal set and the second downlink signal set in the period (i.e., overlapping period). Alternatively, some downlink signal sets may or may not be received according to a prioritization rule in the period (i.e., overlapping period). The priority may be determined by the method described above. Similarly, uplink signal sets transmitted (or not transmitted) by the terminal in the inactive time may be configured independently of each other for a plurality of DTX configurations configured in the terminal, and the terminal may transmit (or not transmit) a corresponding uplink signal set in the inactive time of each DTX configuration.

As described above, an SSSG switching operation, SSSG monitoring operation, PDCCH monitoring skipping operation, and/or the like (hereinafter collectively referred to as 'SSSG monitoring operation') may be indicated to the terminal by DCI. The DCI indicating the PDCCH monitoring operation may be transmitted within a DRX active time, and the PDCCH monitoring operation indicated by the DCI may be performed within the DRX active time. In this case, the indication of the PDCCH monitoring operation may be applied to an active time of a specific DRX configuration. That is, the base station may instruct the terminal to monitor SSSG(s) configured for the specific DRX configuration. Alternatively, the base station may instruct the terminal to skip the PDCCH monitoring operation in a certain period within the active time of the specific DRX configuration.

For example, DRX configuration index(es) (or information corresponding to the DRX configuration index(es)) may be directly included in the DCI indicating the PDCCH monitoring operation. Alternatively, information indicating the PDCCH monitoring operation, which is included in the DCI, may be associated with the DRX configuration index(es) (or information corresponding to the DRX configuration index(es)). The terminal may receive the DCI from the base station, and based on the DRX configuration index(es) obtained based on the DCI, the terminal may identify the DRX configuration(s) to which the indication of the PDCCH monitoring operation is applied. This may be referred to as (Method 200). For another example, the terminal may perform the indicated PDCCH monitoring operation in an active time in which the DCI is received (e.g., an active time corresponding to the specific DRX configuration). When a plurality of active times corresponding to the plurality of DRX configurations overlap in time and the DCI is received in the overlapping period of the plurality of active times, the terminal may perform the indicated operation (e.g., PDCCH monitoring operation) in the plurality of active times. The terminal may not apply the indication to DRX configuration(s) for which a DCI reception time corresponds to a DRX-off period. This may be referred to as (Method 210).

Figure 13:
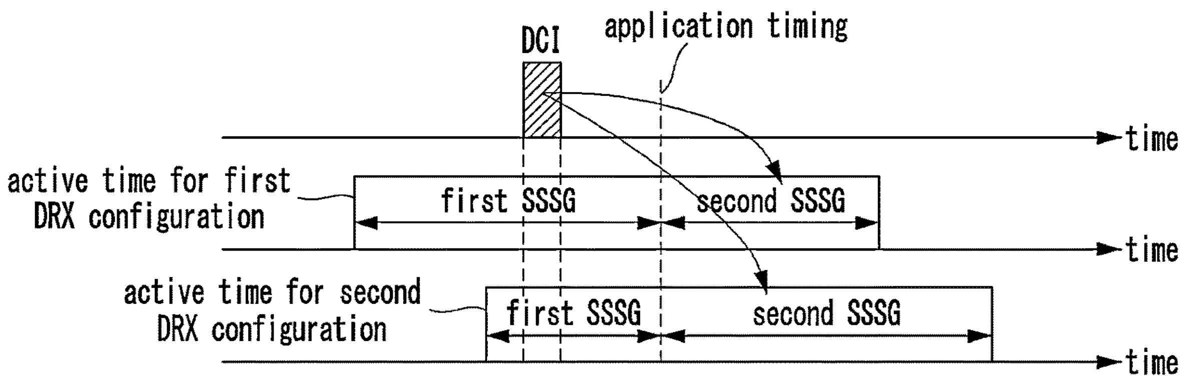
FIG. 13 is a conceptual diagram illustrating a first exemplary embodiment of an SSSG switching indication method for a plurality of DRX configurations.
Figure 14:
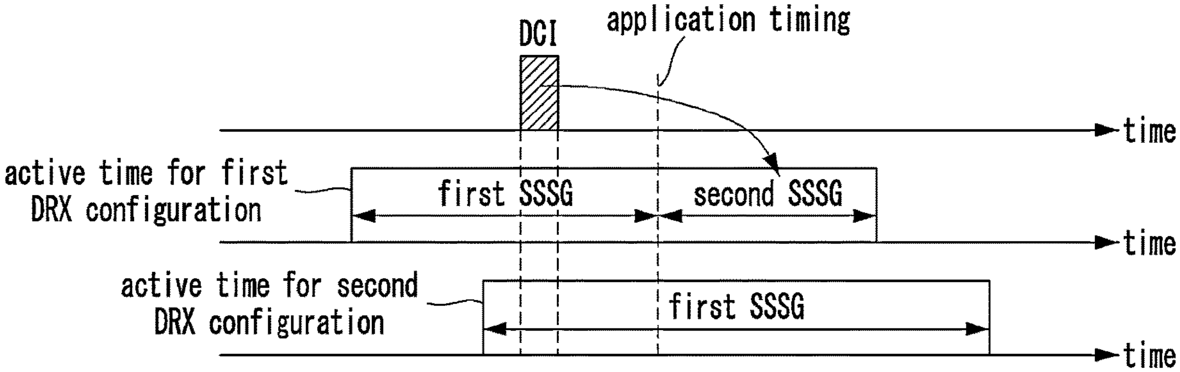
FIG. 14 is a conceptual diagram illustrating a second exemplary embodiment of an SSSG switching indication method for a plurality of DRX configurations.

FIG. 13 is a conceptual diagram illustrating a first exemplary embodiment of an SSSG switching indication method for a plurality of DRX configurations, and FIG. 14 is a conceptual diagram illustrating a second exemplary embodiment of an SSSG switching indication method for a plurality of DRX configurations.

Referring to FIGS. 13 and 14, a terminal may receive information on a plurality of DRX configurations (e.g., a first DRX configuration and a second DRX configuration). An active time of the first DRX configuration and an active time of the second DRX configuration may overlap, and the terminal may receive DCI indicating an SSSG switching operation for switching to a second SSSG (or an operation of monitoring the second SSSG) in a period of the active times.

FIG. 13 shows an SSSG switching indication operation by (Method 210). A time at which the terminal receives the DCI may be included in the active time of the first DRX configuration and the active time of the second DRX configuration. Accordingly, the terminal may perform the switching operation to the second SSSG in the two active times in which the DCI is received and/or in active times of DRX cycles after the corresponding active times. In this case, the same SSSG switching time may be commonly applied to the two active times in which the DCI is received. When the two active times in which the DCI is received have different numerologies (e.g., subcarrier spacings) and/or when the two active times in which the DCI is received correspond to different bandwidth parts, the application time of the SSSG switching indication by the same DCI may vary for each active time. In an exemplary embodiment, the DCI may indicate one SSSG index, and the SSSG index indicated by DCI may be interpreted identically in the plurality of active times. Even when the SSSG indexes for the plurality of active times are the same, an SSSG corresponding to the corresponding SSSG index may be configured differently for each active time. The second SSSG configured for the first DRX configuration may be the same as or different from the second SSSG configured for the second DRX configuration. Alternatively, a method of interpreting the SSSG index indicated by the DCI for each active time may be configured to the terminal. In this case, the terminal may interpret the SSSG index indicated by the DCI to correspond to SSSGs having different indexes in a plurality of active times.

FIG. 14 shows an SSSG switching indication operation by (Method 200). The DCI indicating the SSSG switching, which is received by the terminal, may further include a DRX configuration index (e.g., first DRX configuration) or information corresponding to the DRX configuration index. The terminal may determine to apply the indicated SSSG switching operation to the first DRX configuration based on the DRX configuration index or the information corresponding to the DRX configuration index, and perform the SSSG switching operation to the second SSSG in the active time of the first DRX configuration. As another method for obtaining the above effect, the DRX configuration to which the PDCCH monitoring operation indicated by the DCI is applied may be identified by a PDCCH resource in which the DCI is received (e.g., a search space set, SSSG, monitoring occasion, or CORESET in which the DCI is received). For example, when the DCI is received in a search space set associated with the first DRX configuration or a PDCCH candidate belonging to the corresponding search space set, the terminal may apply the indication of the PDCCH monitoring operation based on the received DCI to the first DRX configuration, and may not apply the indication of the PDCCH monitoring operation to other unrelated DRX configurations. In this case, at least one of a resource, scrambling, DCI format, or search space set type of each PDCCH candidate may be configured differently for each of the plurality of DRX configurations.

Alternatively, the PDCCH monitoring operation indicated by the DCI may be applied to all DRX configurations configured in the terminal. The terminal may monitor only one SSSG in one time period (e.g., one slot) within the active time regardless of whether the active times overlap, and the SSSG that is the target of the monitoring operation may be switched by the indication of the DCI. Alternatively, the terminal may monitor the same SSSG, different SSSGs, the same search space set, and/or different search space sets for each active time. The above-described monitoring operation may be skipped for a common time by an indication of the DCI. The above-described method may be consistently applied regardless of whether the active times overlap or not, whether a reception time of the DCI is included in the active time, and/or the like. In this case, the PDCCH monitoring indication may not be applied to some exceptional DRX configurations, and the exceptional DRX configurations may be configured in the terminal. Alternatively, the exceptional DRX configuration may be a specific DRX configuration predefined in the technical specification (e.g., DRX configuration having an index of 0). Utilizing the above-described exceptional operation, the base station may instruct the terminal to perform different PDCCH monitoring adaptation operations for the respective DRX configurations.

When DCI is received in an SSSG monitoring period indicated by the base station, the terminal may reset an SSSG timer and extend the SSSG monitoring period. When DCI is received in a DRX active time, the terminal may extend the DRX inactivity timer and may extend the DRX active time. The DCI may be DCI received in a specific search space set (e.g., USS set or Type 3 CSS set). Additionally or alternatively, the DCI may be DCI for scheduling a data channel including unicast data. In this case, the SSSG timer reset operation or the DRX inactivity timer reset operation may be applied to all DRX configurations configured in the terminal (or all DRX configurations excluding some exceptional DRX configurations). The timer reset operation may be applied only to DRX configurations corresponding to an active time to which an application time of the timer reset operation belongs. Meanwhile, a method in which the SSSG timer operates outside the DRX active time may be considered. In this case, the timer reset operation may be equally applied to DRX configurations corresponding to an outside period where the application time of the timer reset operation is located (i.e., period outside the active time). The SSSG timer value may be set independently for each DRX configuration (or for each SSSG corresponding to the DRX configuration) within the same bandwidth part or carrier.

Alternatively, the SSSG timer reset operation or the DRX inactivity timer reset operation may be applied to some DRX configuration(s). For example, an index of a DRX configuration to which the timer reset operation is applied or information corresponding to the corresponding index may be additionally included in DCI triggering the timer reset operation. Alternatively, the DCI triggering the timer reset operation may include at least information necessary for determining the DRX configuration to which the timer reset operation is applied. Alternatively, as described above, the DRX configuration to which the timer reset operation is applied may be determined by a PDCCH resource in which the DCI is received.

Figure 15:
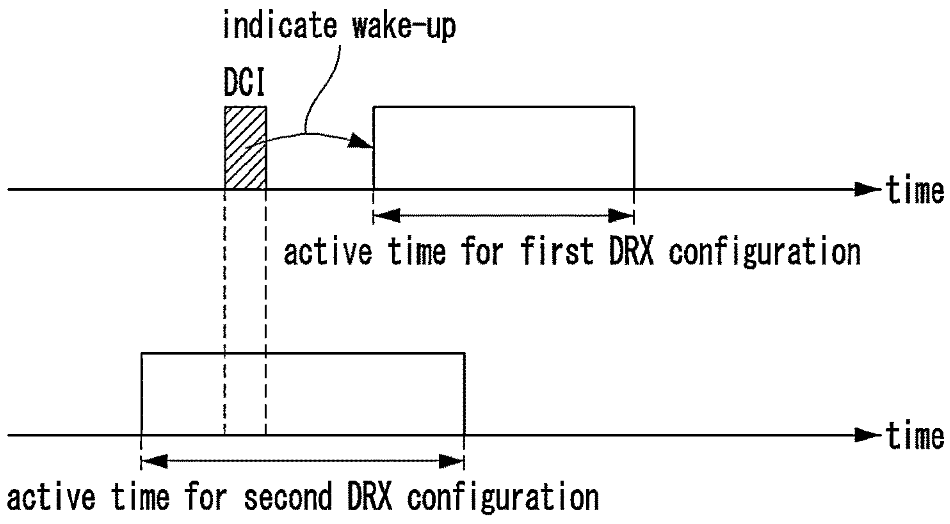
FIG. 15 is a conceptual diagram illustrating a first exemplary embodiment of a WUS monitoring method for a plurality of DRX configurations.

FIG. 15 is a conceptual diagram illustrating a first exemplary embodiment of a WUS monitoring method for a plurality of DRX configurations.

Referring to FIG. 15, a terminal may receive information on a plurality of DRX configurations (e.g., a first DRX configuration and a second DRX configuration). A wake-up operation for the first DRX configuration may be indicated by a first WUS (e.g., DCI). An active time of the first DRX configuration may not coincide with an active time of the second DRX configuration, and a monitoring occasion of the first WUS may be arranged within the active time of the second DRX configuration. According to an exemplary embodiment, a WUS may be monitored only outside a DRX active time. In this case, the terminal may skip monitoring of the first WUS (e.g., DCI), and the wake-up operation for the active time of the first DRX configuration cannot be dynamically indicated.

As a method for solving the above-described problem, a method in which the terminal monitors a WUS in a period outside the DRX active time may be considered. Specifically, the WUS monitoring operation of the terminal may be determined based on an association relationship between WUS and DRX configuration. For example, the monitoring operation for the first WUS may be performed when the monitoring occasion of the first WUS is arrange outside the active time of the first DRX configuration associated with the first WUS. In addition, the monitoring operation for the first WUS may be determined regardless of the location, inclusion relationship, and/or the like of the active time of the second DRX configuration that is not associated with the first WUS. Accordingly, the terminal may monitor the first WUS in the active time of the second DRX configuration, and may determine whether or not to perform a wake-up operation for the active time of the first DRX configuration based on whether or not the first WUS is received, the received information, and/or the like.

The base station may determine whether to apply the wake-up operation by a WUS and/or the operation indicating a dynamic active time by a WUS for each DRX configuration, and based on the determination, the base station may indicate to the terminal whether to apply the above-described operation for each DRX configuration based on the determination. The terminal may receive from the base station Information indicating whether to perform WUS-based wake-up operations, operations for determining the location of the active time, and/or operations for monitoring PDCCHs in the active time for the respective DRX configurations.

In the above-described exemplary embodiments, each of the plurality of DRX configurations configured in the terminal may be for a UE-specific DRX. Alternatively, each of the plurality of DRX configurations configured in the terminal may be for a group DRX. In the latter case, the above-described operation may be equally applied to a plurality of terminals (i.e., a terminal group). Alternatively, a plurality of DRX configurations configured in the terminal may be for both a UE-specific DRX and a group DRX. For example, the first DRX configuration and the second DRX configuration configured in the terminal may be a UE-specific DRX and a group DRX, respectively. Configuration information of the first DRX configuration may be transmitted to the terminal based on UE-specific signaling, and configuration information of the second DRX configuration may be transmitted to the terminal based on UE-group common (or UE-group-specific) signaling or cell-common (or cell-specific) signaling. Alternatively, configuration information of the second DRX configuration may also be transmitted to the terminal based on UE-specific signaling.

Figure 16:
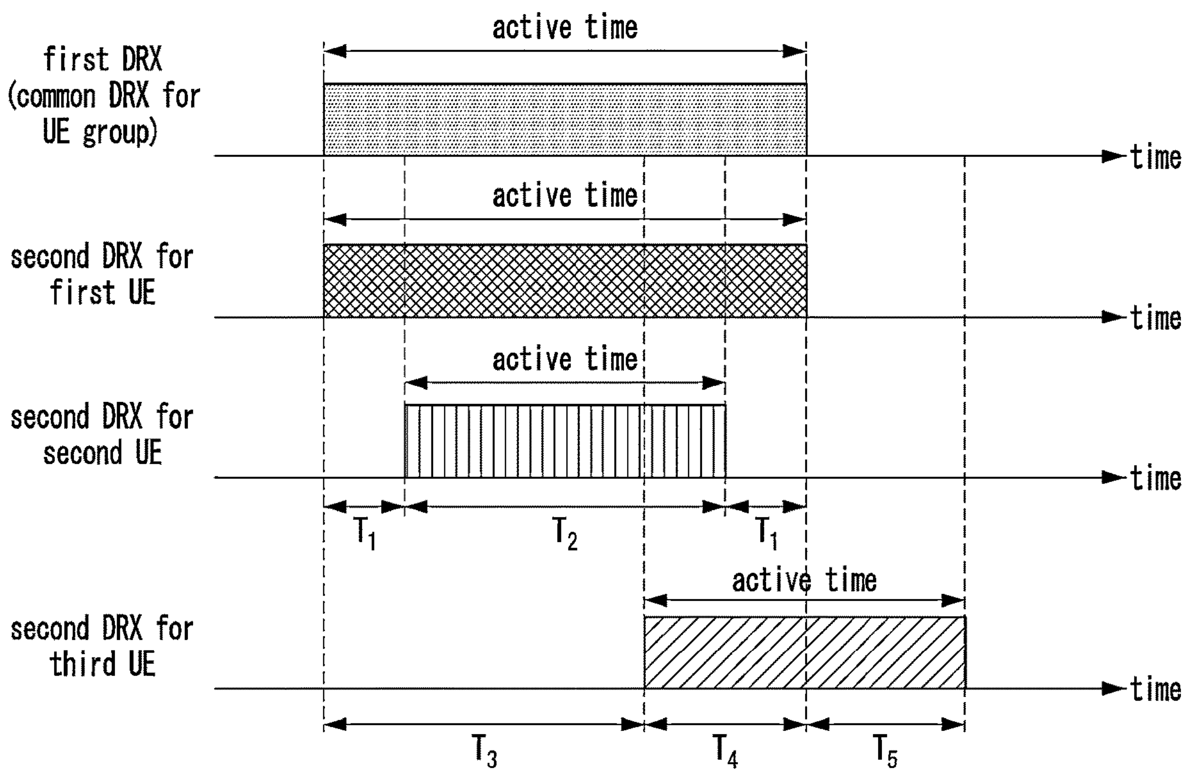
FIG. 16 is a conceptual diagram illustrating a first exemplary embodiment of a method for configuring a group DRX and a UE-specific DRX.

FIG. 16 is a conceptual diagram illustrating a first exemplary embodiment of a method for configuring a group DRX and a UE-specific DRX.

Referring to FIG. 16, a base station may configure a first DRX for a plurality of terminals. The first DRX may be a group DRX and may be commonly applied to the plurality of terminals. The plurality of terminals may include a first terminal, a second terminal, and a third terminal. In addition, the base station may further configure a second DRX for each terminal. The second DRX may be a UE-specific DRX.

An active time of the first DRX and an active time of the second DRX may overlap each other. For example, the active time of the first DRX and the active time of the second DRX configured in the terminal may coincide. For another example, the active time of the first DRX and the active time of the second DRX configured in the second terminal may have an inclusion relationship. An inverse inclusion relationship may not be established. That is, the base station may configure the first DRX configuration and the second DRX configuration such that the active time of the second DRX is always included in the active time of the first DRX. Alternatively, the base station may configure the first DRX configuration and the second DRX configuration such that the active time of the second DRX coincides with the active time of the first DRX in the terminal. The terminal may expect that the first DRX configuration and the second DRX configuration are configured in the terminal such that the active time of the second DRX is always included in the active time of the first DRX. Alternatively, the terminal may expect that the first DRX configuration and the second DRX configuration are configured in the terminal such that the active time of the first DRX coincides with the active time of the second DRX. For another example, the active time of the first DRX and the active time of the second DRX configured in the third terminal may partially overlap. That is, a part of the active time of the second DRX may overlap with the active time of the first DRX. In addition, a part of the active time of the first DRX may overlap with the active time of the second DRX.

In the above-described exemplary embodiment, the terminal may perform different DRX operations for the plurality of DRX configurations. For example, the terminal may skip a reception operation and/or a PDCCH monitoring operation for a downlink signal set in the inactive time of the first DRX (i.e., group DRX), and may skip a PDCCH monitoring operation in the inactive time of the second DRX (i.e., UE-specific DRX). In the case of the first terminal, since the inactive time of the first DRX and the inactive time of the second DRX coincide, the DRX operation of the first terminal may be performed based on one DRX (e.g., the first DRX). For example, the first terminal may perform both a reception operation and a PDCCH monitoring operation for a downlink signal set in the active time of the first DRX, and may skip both the reception operation and the PDCCH monitoring operation for a downlink signal set in the inactive time of the first DRX. The above-described operation of the first terminal may be performed regardless of the active time and the inactive time of the second DRX.

On the other hand, in the case of the second terminal and the third terminal, since the inactive time of the first DRX and the inactive time of the second DRX do not coincide, the second terminal and the third terminal may perform different operations for each period among periods formed by combinations of the first DRX and the second DRX. For example, the second terminal may perform both a reception operation and a PDCCH monitoring operation of a downlink signal set in the active time of the first DRX and the active time of the second DRX (i.e., T2 period). Although the second terminal may perform a reception operation of a downlink signal set in the active time of the first DRX and the inactive time of the second DRX (i.e., T1 period(s)), the second terminal may skip the PDCCH monitoring operation. The second terminal may skip both the reception operation and the PDCCH monitoring operation for the downlink signal set in the inactive time of the first DRX. The third terminal may perform both a reception operation and a PDCCH monitoring operation for a downlink signal set in the active time of the first DRX and the active time of the second DRX (i.e., T4 period). Although the third terminal may perform the reception operation for the downlink signal set in the active time of the first DRX and the inactive time of the second DRX (i.e., T3 period), the third terminal may skip the PDCCH monitoring operation. The third terminal may omit skip the reception operation and the PDCCH monitoring operation for the downlink signal set in the inactive time of the first DRX (i.e., the remaining period including T5).

According to the method described above, the terminal may receive a first downlink signal set in the active time of the first DRX configuration and receive a second downlink signal set in the inactive time of the first DRX configuration. In the time domain, the active time and the inactive time according to the first DRX configuration may be distinguished. An intersection between the first downlink signal set and the second downlink signal set may include at least an SSB. A difference between the first downlink signal set and the second downlink signal set may include at least a PDSCH including unicast data.

Meanwhile, whether to transmit a PDCCH in a CORESET or search space set configured in the terminal may be determined instantaneously by the base station. Therefore, the terminal may monitor a CORESET or search space set (i.e., corresponding PDCCH candidate(s)) in the inactive time of the group DRX. When the terminal successfully blind-decodes a PDCCH candidate in the inactive time of the group DRX, the terminal may exceptionally receive a PDCCH (or, DCI or DCI format) corresponding to the PDCCH candidate. In addition, the terminal may perform a subsequent operation according to reception of the PDCCH. When a UE-specific DRX is configured in the terminal (e.g., when a UE-specific DRX configured in the terminal is activated), a PDCCH monitoring and reception operation of the terminal may be performed limitedly within the active time of UE-specific DRX. According to the above-described method, in the above-described exemplary embodiment, the third terminal may perform a PDCCH monitoring operation in the inactive time of the first DRX and the active time of the second DRX (i.e., period T5). The third terminal may perform the same operation as described above in the remaining time period.

Based on the above-described operation of the terminal, the base station may transmit the PDCCH when control information transmission is prioritized in a search space set belonging to the inactive time of the group DRX (or cell DTX). When a network low-power operation is prioritized, the base station may operate in a low-power mode without transmitting the PDCCH. That is, the base station may dynamically determine whether to transmit the PDCCH in a period outside the active time of the group DRX (or cell DTX). The above-described operation may be equally applied to an SPS PDSCH. That is, the terminal may receive (or blind-decode) a PDSCH from an SPS PDSCH resource configured in the inactive time of the group DRX. The terminal may receive the PDSCH when blind decoding is successful in the SPS PDSCH resource. The base station may dynamically determine whether or not to transmit the PDSCH in the SPS PDSCH resource, and may adaptively expand or contract a low-power operation period.

In the inactive time of the group DRX and/or the active time of the UE-specific DRX, the terminal may monitor a specific CORESET, a specific search space set, or a specific DCI format. For example, the terminal may monitor only a CORESET (e.g., CORESET 0) having a specific ID in the time period. For another example, the terminal may monitor a CSS set (or a CSS set having a specific type or Type 0, 0A, 1, and/or 2 CSS set) in the time period. In addition, in order to receive periodic control information, the terminal may monitor a Type 3 CSS set in the time period. Alternatively, the terminal may monitor a group common PDCCH, group common DCI format, DCI format 2_X (X=0, 1, 2, 3, etc.) in the time period. Alternatively, the terminal may monitor and receive a DCI format including scheduling information of a data channel (e.g., PDSCH, PUSCH, PSSCH) in the time period. When the DCI format is successfully received, the terminal may receive or transmit the data channel exceptionally regardless of whether the scheduled data channel belongs to the active time of the group DRX or group DTX. Alternatively, even when the DCI format is successfully received, the terminal may receive or transmit the scheduled data channel only when the scheduled data channel belongs to the active time of the group DRX or group DTX, and may not transmit or receive the data channel when the scheduled data channel does not belong to the active time of the group DRX. The CORESET(s), search space set(s), and/or DCI format(s) monitored by the terminal in the inactive time of the group DRX and/or the active time of the UE-specific DRX may be configured by the base station to the terminal based on a signaling procedure (e.g., RRC signaling, MAC CE, DCI, and/or the like).

According to the above-described method, the search space set(s) (e.g., search space set group (SSSG)) monitored by the terminal in the active time of the group DRX and the search space set(s) (e.g., search space set group (SSSG)) monitored by the terminal in the inactive time of the group DRX may not coincide. The terminal may divide periods (e.g., the active time and the inactive time of the group DRX) even within the active time of the UE-specific DRX, and may monitor different search space set(s) for the respective periods.

Alternatively, even when the inactive time of the first DRX and the inactive time of the second DRX do not coincide, the DRX operation of the terminal may be performed based on one DRX (e.g., the first DRX). For example, the second terminal and the third terminal may perform both a reception operation and a PDCCH monitoring operation for a downlink signal set in the active time of the first DRX. The reception operation and the PDCCH monitoring operation may for the downlink signal set may be performed regardless of the active time of the second DRX. The second terminal and the third terminal may skip both the reception operation and the PDCCH monitoring operation for the downlink signal set in the inactive time of the second DRX. The reception operation and the PDCCH monitoring operation for the downlink signal set may be skipped regardless of the active time of the second DRX. That is, when the group DRX and the UE-specific DRX are simultaneously configured, the operation of the terminal (e.g., downlink signal reception and/or monitoring operation) may be performed based on the group DRX. In other words, the operation of the terminal based on the UE-specific DRX configuration may be changed by group DRX configuration or overridden by the operation of the terminal based on the group DRX.

A plurality of bandwidth parts may be configured in one serving cell. The terminal may apply different bandwidth parts to a plurality of DRX configurations, and may perform a signal reception operation (e.g., PDCCH monitoring operation, data channel transmission and reception operation). For example, the terminal may activate a first bandwidth part in the active time of the first DRX configuration, and may perform a signal monitoring operation or transmission operation in the activated first bandwidth part. The terminal may activate a second bandwidth part in the active time of the second DRX configuration, and may perform a signal monitoring operation or transmission operation in the activated second bandwidth part. According to the above-described method, the bandwidth part may be dynamically activated, deactivated, or switched by a signal indicating a location of a WUS or DRX active time. The terminal may deactivate the activated bandwidth part after the DRX active time ends, and switch the current bandwidth part to a specific bandwidth part (e.g., default bandwidth part). The terminal may activate a bandwidth part corresponding to a start time of the DRX active time (e.g., the first-numbered slot of the active time). To support this operation, the terminal may perform a switching operation of the bandwidth part before the DRX active time starts (e.g., the last slot(s) or last symbol(s) of the previous DRX cycle), and may not perform a signal monitoring operation or transmission operation during a period in which the switching operation is performed.

The above-described dynamic switching operation of the bandwidth part may be applied only to some DRX configurations. For example, the above-described dynamic switching operation of the bandwidth part may not be applied to the first DRX configuration and may be applied to the second DRX configuration. The terminal may perform the switching operation to the second bandwidth part periodically every active time of the second DRX cycle. Meanwhile, an active time of a certain cycle of the first DRX configuration and an active time of a certain cycle of the second DRX configuration may temporally overlap. In this case, the terminal may apply a specific bandwidth part to an overlapping period of the active times or an entire period of the overlapping active times. The specific bandwidth part may be determined as a bandwidth part having a higher priority among the first bandwidth part and the second bandwidth part. The priority may be a priority between the bandwidth parts or a priority between the DRX configurations. Alternatively, the switching operation of the bandwidth part may be skipped in the overlapping period of the active times or the entire period of the overlapping active times. For example, the terminal may skip the switching operation to the second bandwidth part in the period, and may identically apply, to the period, a bandwidth part (e.g., the first bandwidth part or default bandwidth part) activated before the period.

For low-power operations of the terminal, it may be preferable for the terminal to end the active time as quickly as possible and enter a sleep period after traffic transmission is completed. As one method, the terminal may receive a MAC CE indicating to enter a DRX-off period from the base station, and may enter the DRX-off period according to the indication of the MAC CE. According to the above-described method, a predetermined delay time may exist until the terminal receives the downlink signal and applies the received downlink signal to the PDCCH monitoring operation.

As a proposed method, the terminal may receive DCI from the base station, and control information included in the received DCI may indicate skipping of the PDCCH monitoring operation or entry into the DRX-off period (or sleep period). For example, the DCI may be scheduling DCI (e.g., DCI for scheduling a PDSCH or PUSCH, DCI for scheduling unicast data, DCI format 1_0/1_1/1_2, DCI format 0_0/0_1/0_2, and/or the like). The terminal may receive first DCI, identify scheduling information for a PDSCH or PUSCH based on first information included in the first DCI, and identify indication of skipping the PDCCH monitoring or entry into the DRX-off period based on second information included in the first DCI.

When a predetermined condition is satisfied, the terminal may perform the operation indicated by the DCI. For example, when the terminal transmits ACK in response to the PDSCH scheduled through the DCI, the terminal may perform the operation indicated by the DCI. When the terminal transmits NACK in response to the PDSCH scheduled through the DCI, the terminal may not perform the operation indicated by the DCI. The active time of the terminal may be maintained, and the terminal may continue to perform the PDCCH monitoring operation within the active time. Even when the terminal does not transmit the HARQ-ACK for the PDSCH scheduled through the DCI to the base station under the predetermined condition, the terminal may not perform the operation indicated by the DCI. For another example, when the terminal transmits a PUSCH scheduled through the DCI to the base station, the terminal may perform the operation indicated by the DCI. When the terminal does not transmit the PUSCH scheduled through the DCI to the base station, the terminal may not perform the operation indicated by the DCI. In addition, the terminal may or may not perform the operation indicated by the DCI based on whether or not to perform a transmission operation of the PUCCH (e.g., PUCCH including an SRS and/or CSI feedback information) scheduled through the DCI. Alternatively, the terminal may perform the operation indicated by the DCI regardless of whether to perform the transmission operation of the PUCCH (e.g., PUCCH including an SRS and/or CSI feedback information) scheduled through the DCI.

As a method similar to the above-described method, in each of the case when ACK is transmitted as a HARQ response to the PDSCH and the case when NACK is transmitted as a HARQ response to the PDSCH (or when the HARQ-ACK is not transmitted), the terminal may perform a different PDCCH monitoring operation. For example, the terminal may perform a first indicated operation when transmitting ACK as a HARQ response to the PDSCH. The terminal may perform a second indicated operation when transmitting NACK as a HARQ response to the PDSCH (or when the HARQ-ACK is not transmitted). The first indicated operation may mean an operation of the terminal monitoring first search space set(s), and the second indicated operation may mean an operation of the terminal monitoring second search space set(s). For example, the first search space set(s) may be included in the second search space set(s). As a method similar to the above-described method, the DCI may include information informing that the DCI is the last signal (or last DCI) transmitted in the current active time or that a TB (or PDSCH, PUSCH) scheduled by the DCI is the last TB (or PDSCH, PUSCH) transmitted in the current active time. The terminal may perform the above-described operation (e.g., operation of omitting PDCCH monitoring or entering the DRX-off period) based on the information.

The terminal may apply the indicated operation to a time (e.g., slot or symbol) after a predetermined time elapses from a time at which the DCI is received (e.g., a slot or symbol at which the DCI is received). For example, the terminal may receive the DCI in a slot n, and may omit the PDCCH monitoring operation or enter the DRX-off period from a slot (n+3). In this case, the terminal may not expect that DCI is received or a PDSCH or PUSCH is scheduled in a period between the time (e.g., slot n) at which the DCI is received and the time (e.g., slot (n+3)) at which the indicated operation is applied. The DCI may be DCI having a specific DCI format or DCI having a CRC scrambled by a specific RNTI (e.g., C-RNTI, MCS-C-RNTI, or CS-RNTI). The DCI may be DCI for scheduling unicast data (e.g., unicast PDSCH, unicast PUSCH). The terminal may expect to receive another DCI in the period. The PDSCH or PUSCH may be a PDSCH or PUSCH including a TB different from the PDSCH or PUSCH scheduled by the DCI received in the slot n (or corresponding to another HARQ process). The time at which the terminal applies the indicated operation may be predefined in the technical specification. Alternatively, the time at which the terminal applies the indicated operation may be configured by the base station to the terminal.

Meanwhile, the terminal may aggregate a plurality of carriers (or serving cells) configured by the base station, and may transmit and receive signals with the base station using the aggregated plurality of carriers. To support this operation, the terminal may receive configuration information of one primary cell and one or more secondary cell(s). That is, the base station may configure one primary cell and one or more secondary cell(s) in the terminal. In addition, for a terminal for which a dual connectivity operation is configured, one primary secondary cell may be configured for a secondary cell group, and one or more secondary cell(s) may be additionally configured for the secondary cell group.

The DRX operation of the terminal may be applied to a plurality of carriers (or serving cells). Cells to which DRX operations according to the same DRX configuration are applied or cells to which an indication of DCI related to DRX operations are jointly applied may be referred to as a DRX cell group. The terminal may receive a WUS in one representative carrier belonging to the DRX cell group, and based on the received WUS, the terminal may apply an operation of determining a location (e.g., start time) of an active time of the next DRX cycle, a wake-up operation, and/or the like to all the carriers belonging to the DRX cell group. In this case, the DRX cell group may necessarily include the primary cell or the primary secondary cell, and the representative carrier in which the terminal receives the WUS may be the primary cell or the primary secondary cell. The carriers may be downlink carriers.

Figure 17:
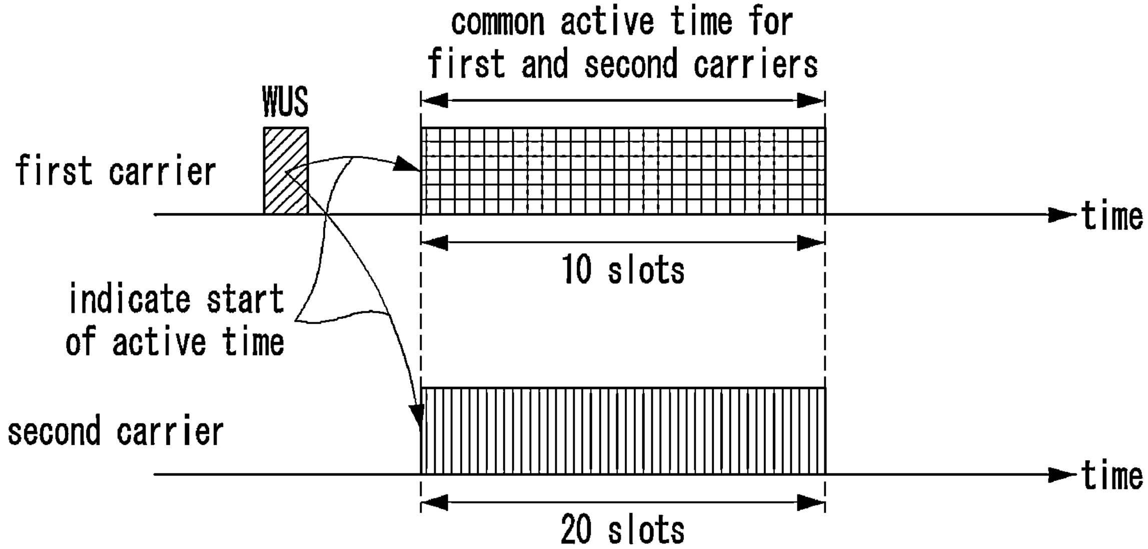
FIG. 17 is a conceptual diagram illustrating a first exemplary embodiment of an active time indication method for a DRX cell group.

FIG. 17 is a conceptual diagram illustrating a first exemplary embodiment of an active time indication method for a DRX cell group.

Referring to FIG. 17, a terminal may aggregate a first carrier and a second carrier. The first carrier and the second carrier may belong to the same DRX cell group. A base station may transmit a WUS to the terminal in the first carrier, and may indicate a DRX active time commonly applied to the first carrier and the second carrier through the WUS. The DRX active time may include at least a start time of the DRX active time. According to the above-described method, the terminal may perform a PDCCH monitoring operation for the plurality of carriers in the same time period, and a wake-up period of the terminal may be minimized. Different subcarrier spacings may be used for the first carrier and the second carrier. In this case, the common DRX active time may correspond to different numbers of slots in the respective carriers. For example, the subcarrier spacing of the second carrier may be twice the subcarrier spacing of the first carrier, the common DRX active time may correspond to 10 slots in the first carrier, and the common DRX active time may correspond to 20 slots in the second carrier.

Meanwhile, numerologies (e.g., subcarrier spacings), slot format configurations (e.g., uplink and downlink transmission direction configurations), periodic signal resource configurations, traffic loads, and/or the like may be different in the plurality of carriers. In this case, it may be inefficient to configure the same DRX active time for the plurality of carriers.

Figure 18:
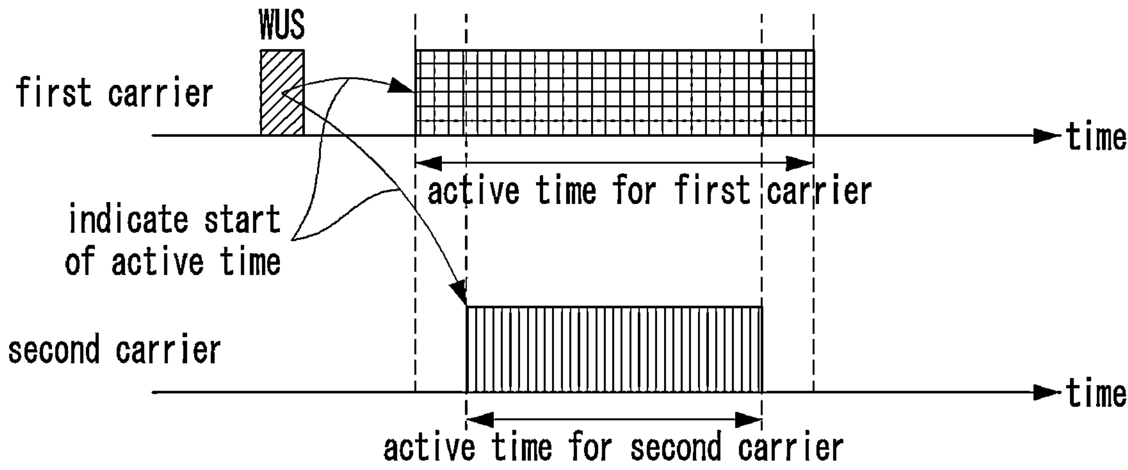
FIG. 18 is a conceptual diagram illustrating a second exemplary embodiment of an active time indication method for a DRX cell group.

FIG. 18 is a conceptual diagram illustrating a second exemplary embodiment of an active time indication method for a DRX cell group.

Referring to FIG. 18, a terminal may aggregate a first carrier and a second carrier. The first carrier and the second carrier may belong to the same DRX cell group. A base station may transmit a WUS to the terminal in the first carrier. DRX active times of the first carrier and the second carrier may be indicated by the WUS. The DRX active time may include at least a start time of the DRX active time.

In this case, the active times (e.g., start times and/or lengths) indicated for the first carrier and the second carrier may be different from each other. The active time of the second carrier may be included in the active time of the first carrier. In general, an active time of a representative carrier in which the WUS is received may include active times of other carriers belonging to the same DRX cell group as the representative carrier. According to another exemplary embodiment, an inclusion relationship between the active time of the first carrier and the active time of the second carrier may not be established. In this case, each of the start time of the active time of the first carrier and the start time of the active time of the second carrier may be configured as a slot after a predetermined time (e.g., predetermined number of symbols) from a reception time of the WUS (e.g., the last symbol of the DCI). The base station may configure the same or different active times (e.g., start times and/or lengths of the active times) to the terminal for the respective carriers. The active time for each carrier may be mapped to one codepoint of a specific field of the WUS DCI. The terminal may receive the WUS and obtain a codepoint. In this case, the terminal may apply an active time configuration value mapped to the codepoint for each carrier, and may determine the DRX active time for each carrier.

The aforementioned SSSG timer reset operation and DRX inactivity timer reset operation may be performed in units of a DRX cell group. The terminal may receive DCI in the first carrier belonging to the DRX cell group, and successful reception of the DCI may trigger the SSSG timer reset operation or the DRX inactivity timer reset operation for the carriers belonging to the same DRX cell group. The carriers to which the timer reset operation is applied may always include the first carrier. Alternatively, even when the DRX operation or the WUS-related operation is performed in units of a DRX cell group, the SSSG timer reset operation and the DRX inactivity timer reset operation may be individually performed for each carrier. When DCI is received in the first carrier belonging to the DRX cell group, the terminal may perform the SSSG timer reset operation or DRX inactivity timer reset operation only for the first carrier.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

The invention claimed is:

1. A method of a terminal, comprising:

receiving first discontinuous reception (DRX) configuration information from a base station;

identifying a first DRX active time and a first DRX inactive time based on the first DRX configuration information;

receiving a first downlink signal set from the base station in the first DRX active time; and receiving a second downlink signal set from the base station in the first DRX inactive time, wherein the first DRX active time is distinguished from the first DRX inactive time in time domain, an intersection between the first downlink signal set and the second downlink signal set includes at least a synchronization signal block (SSB), and a difference between the first downlink signal set and the second downlink signal set includes at least a physical downlink shared channel (PDSCH) including unicast downlink data.

2. The method according to claim 1, wherein the first DRX configuration information is included in a downlink control information (DCI) format commonly transmitted to a terminal group.

3. The method according to claim 1, wherein the first DRX configuration information is received by the terminal together with discontinuous transmission (DTX) configuration information.

4. The method according to claim 3, wherein at least a physical uplink shared channel (PUSCH) including unicast uplink data is not transmitted from the terminal in a DTX inactive time configured based on the DTX configuration information.

5. The method according to claim 1, further comprising:

receiving second DRX configuration information from the base station;

identifying a second DRX active time and a second DRX inactive time based on the second DRX configuration information; and performing a monitoring operation on one or more search space sets in the second DRX active time.

6. The method according to claim 5, wherein the first DRX active time is divided into a first time period belonging to the second DRX active time and a second time period belonging to the second DRX inactive time, and different physical downlink control channel (PDCCH) monitoring operations are performed in the first time period and the second period.

7. The method according to claim 5, wherein the first DRX active time is divided into a first time period belonging to the second DRX active time and a second time period belonging to the second DRX inactive time, and a PDCCH monitoring operation is skipped in the second time period.

8. The method according to claim 5, wherein the second DRX active time is divided into a third time period belonging to the first DRX active time and a fourth time period belonging to the first DRX inactive time, and monitoring operations on different search space sets are performed in the third time period and the fourth time period.

9. The method according to claim 8, wherein in the third time period and the fourth time period, a common search space (CSS) set is commonly monitored.

10. The method according to claim 5, wherein the second DRX configuration information is included in a terminal-specific radio resource control (RRC) message transmitted to the terminal.

11. A method of a base station, comprising:

transmitting first discontinuous reception (DRX) configuration information to a terminal;

transmitting a first downlink signal set to the terminal in a first DRX active time according to the first DRX configuration information; and transmitting a second downlink signal set to the terminal in a first DRX inactive time according to the first DRX configuration information, wherein the first DRX active time is distinguished from the first DRX inactive time in time domain, an intersection between the first downlink signal set and the second downlink signal set includes at least a synchronization signal block (SSB), and a difference between the first downlink signal set and the second downlink signal set includes at least a physical downlink shared channel (PDSCH) including unicast downlink data.

12. The method according to claim 11, wherein the first DRX configuration information is included in a downlink control information (DCI) format commonly transmitted to a terminal group.

13. The method according to claim 11, wherein the first DRX configuration information is transmitted to the terminal together with discontinuous transmission (DTX) configuration information.

14. The method according to claim 13, wherein at least a physical uplink shared channel (PUSCH) including unicast uplink data is not received from the terminal in a DTX inactive time configured based on the DTX configuration information.

15. A terminal comprising a processor, wherein the processor causes the terminal to perform:

receiving first discontinuous reception (DRX) configuration information from a base station;

identifying a first DRX active time and a first DRX inactive time based on the first DRX configuration information;

receiving a first downlink signal set from the base station in the first DRX active time; and receiving a second downlink signal set from the base station in the first DRX inactive time, wherein the first DRX active time is distinguished from the first DRX inactive time in time domain, an intersection between the first downlink signal set and the second downlink signal set includes at least a synchronization signal block (SSB), and a difference between the first downlink signal set and the second downlink signal set includes at least a physical downlink shared channel (PDSCH) including unicast downlink data.

16. The terminal according to claim 15, wherein the first DRX configuration information is received by the terminal together with discontinuous transmission (DTX) configuration information, and at least a physical uplink shared channel (PUSCH) including unicast uplink data is not transmitted from the terminal in a DTX inactive time configured based on the DTX configuration information.

17. The terminal according to claim 15, wherein the processor further causes the terminal to perform:

receiving second DRX configuration information from the base station;

identifying a second DRX active time and a second DRX inactive time based on the second DRX configuration information; and performing a monitoring operation on one or more search space sets in the second DRX active time.

18. The terminal according to claim 17, wherein the first DRX active time is divided into a first time period belonging to the second DRX active time and a second time period belonging to the second DRX inactive time, and different physical downlink control channel (PDCCH) monitoring operations are performed in the first time period and the second period.

19. The terminal according to claim 17, wherein the first DRX active time is divided into a first time period belonging to the second DRX active time and a second time period belonging to the second DRX inactive time, and a PDCCH monitoring operation is skipped in the second time period.

20. The terminal according to claim 17, wherein the second DRX active time is divided into a third time period belonging to the first DRX active time and a fourth time period belonging to the first DRX inactive time, and monitoring operations on different search space sets are performed in the third time period and the fourth time period.

* * * * *